United States Patent
Kakui

(10) Patent No.: US 6,954,305 B2
(45) Date of Patent: Oct. 11, 2005

(54) OPTICAL AMPLIFIER AND OPTICAL TRANSMISSION SYSTEM USING IT

(75) Inventor: Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 179 days.

(21) Appl. No.: 10/254,528

(22) Filed: Sep. 26, 2002

(65) Prior Publication Data

US 2003/0058526 A1 Mar. 27, 2003

Related U.S. Application Data

(60) Provisional application No. 60/355,759, filed on Feb. 12, 2002.

(30) Foreign Application Priority Data

Sep. 26, 2001 (JP) ..................... P2001-294349

(51) Int. Cl.$^7$ ................................ H01S 3/00
(52) U.S. Cl. .................................. 359/337.3
(58) Field of Search ............................ 359/349, 337.3, 359/341.4, 341.5

(56) References Cited

U.S. PATENT DOCUMENTS

| | | | | |
|---|---|---|---|---|
| 5,721,635 A | * | 2/1998 | Shigematsu et al. | 359/337.3 |
| 6,049,417 A | * | 4/2000 | Srivastava et al. | 359/337.4 |
| 6,307,668 B1 | * | 10/2001 | Bastien et al. | 359/337.1 |
| 6,381,063 B1 | * | 4/2002 | Liu | 359/337 |
| 6,396,623 B1 | * | 5/2002 | Wysocki et al. | 359/337.4 |
| 6,421,172 B1 | * | 7/2002 | Flood et al. | 359/341.41 |
| 6,437,907 B1 | * | 8/2002 | Yoon et al. | 359/341.32 |
| 6,441,953 B1 | * | 8/2002 | Cowle et al. | 359/341.3 |
| 6,483,636 B1 | * | 11/2002 | Sugaya et al. | 359/349 |
| 6,501,597 B1 | * | 12/2002 | Pitt et al. | 359/349 |
| 6,529,320 B2 | * | 3/2003 | Gregory et al. | 359/349 |
| 6,532,104 B1 | * | 3/2003 | Bayart | 359/337.4 |
| 6,560,009 B1 | * | 5/2003 | Andrejco et al. | 359/343 |
| 6,621,627 B2 | * | 9/2003 | Willner et al. | 359/349 |
| 6,633,429 B2 | * | 10/2003 | Kinoshita et al. | 359/337.1 |
| 6,646,796 B2 | * | 11/2003 | Song et al. | 359/349 |
| 6,667,829 B2 | * | 12/2003 | Hatami-Hanza et al. | 359/349 |
| 6,674,570 B2 | * | 1/2004 | Song et al. | 359/349 |
| 6,724,527 B2 | * | 4/2004 | Endo et al. | 359/337.4 |
| 2001/0033411 A1 | * | 10/2001 | Shiota et al. | 359/333 |
| 2002/0181080 A1 | * | 12/2002 | Lim | 359/337.1 |

FOREIGN PATENT DOCUMENTS

JP    11-317560    11/1999    ............. H01S/3/17

OTHER PUBLICATIONS

IEICE Trans. of Electron, vcl E83–C, No. 6, 2000, pp. 799, Kakui et al.
Tadashi Kasamatsu et al., OAA1999, Postdeadline paper 1, 1999.

* cited by examiner

Primary Examiner—Bernarr E. Gregory
Assistant Examiner—Deandra M. Hughes
(74) Attorney, Agent, or Firm—McDermott Will & Emery LLP

(57) ABSTRACT

An optical amplifier 1 is constructed using an amplification optical waveguide in which a first amplification optical fiber 10 and a second amplification optical fiber 20 are connected in series. A P/Al-codoped EDF 10 excellent in noise characteristics is applied to the upstream first amplification optical fiber 10, and an EDF 20 such as an Al-doped EDF or the like is applied to the downstream second amplification optical fiber 20. This realizes the optical amplifier 1, and the optical transmission system using it, capable of amplifying the signal light in the signal light wavelength band of not less than the wavelength of 1570 nm including the L-band wavelength band of wavelengths from 1570 to 1600 nm, with good gain characteristics and achieving the improvement in the noise characteristics.

14 Claims, 11 Drawing Sheets

OPTICAL AMPLIFIER AND OPTICAL TRANSMISSION SYSTEM USING IT

CROSS-REFERENCE TO RELATED APPLICATION

This application claims priority to Provisional Application Ser. No. 60/355,759 filed Feb. 12, 2002, which is hereby incorporated by reference in its entirety.

BACKGROUND OF THE INVENTION

1. Field of the Invention

The present invention relates to an optical amplifier for amplifying signal light by pumping light and to an optical transmission system using it.

2. Related Background Art

An optical amplifier is a device for amplifying signal light transmitted through an optical transmission line, such as an optical fiber transmission line or the like, in an optical transmission system in order to compensate for transmission loss in the optical transmission line. The optical amplifier is comprised of an amplification optical waveguide, such as an amplification optical fiber or the like, and a pumping light supplying means for supplying pumping light into the amplification optical waveguide. When the signal light is injected into the amplification optical waveguide with supply of the pumping light, the input signal light is amplified in the amplification optical waveguide.

Such optical amplifiers include, for example, rare-earth-element-doped fiber amplifiers using a rare-earth element, such as Er (erbium) or the like, as a fluorescent material for the amplification. The rare-earth-element-doped fiber amplifiers (e.g., EDFA: Erbium-Doped Fiber Amplifier) are optical amplifiers using a rare-earth-element-doped optical fiber (e.g., EDF: Erbium-Doped Fiber) as an amplification optical waveguide.

SUMMARY OF THE INVENTION

In recent years, in order to meet the social needs with the coming of highly-networked information society, research and development is being actively conducted on high-capacity communication and long-haul communication utilizing optical fiber transmission networks. A WDM (Wavelength Division Multiplexing) transmission system is a system for transmitting multiple-wavelength signal light consisting of a plurality of signal lightwaves of mutually different wavelengths through an optical fiber transmission line, thereby implementing high-speed and large-capacity optical communication. For the WDM transmission system, attempts are being made to broaden the signal light wavelength band of the multi-wavelength signal light in order to implement higher-capacity transmission.

In the WDM transmission system as described, light in a wavelength band in the 1.55 μm wavelength band is mainly used as the signal light. More specifically, the C-band (Conventional band) wavelength band of wavelengths from 1530 to 1565 nm is used as a signal light wavelength band in the WDM transmission system. The aforementioned EDFA is an optical amplifier the amplification wavelength band of which is the C-band wavelength band, so that it is of significance in construction of the WDM transmission system.

On the other hand, use of the L-band (Long-wavelength band) wavelength band of wavelengths from 1570 to 1600 nm is under way in order to expand the signal light wavelength band in the 1.55 μm wavelength band to achieve broadening of the band. In order to effectively utilize the L-band wavelength band as a signal light wavelength band in the WDM transmission system, it is indispensable to develop an optical amplifier the amplification wavelength band of which is the L-band wavelength band, like the EDFA for the C-band wavelength band.

For meeting this demand, for example, Document 1 "IEICE Trans. of Electronics, E83-C No. 6 p. 799 (2000)" and Document 2 "Japanese Patent Application Laid-Open No. H11-317560" describe the EDFAs using P-doped EDF or P/Al-codoped EDF in place of the ordinary EDF, as optical amplifiers capable of amplifying the signal light in the L-band wavelength band. However, these EDFAs failed to attain satisfactory characteristics as optical amplifiers for the L-band wavelength band. Particularly, important characteristics of the optical amplifiers are the gain characteristics including the magnitude, flatness, etc. of amplification gain, and the noise characteristics of noise light appearing in the optical amplifier, and the aforementioned optical amplifiers had the problem that these characteristics were not satisfactorily achieved in the L-band wavelength band.

The present invention has been accomplished in order to solve the above problem and an object of the invention is to provide an optical amplifier capable of amplifying the signal light in the signal light wavelength band not less than the wavelength of 1570 nm with good gain characteristics and achieving improvement in the noise characteristics thereof, and an optical transmission system using the optical amplifier.

In order to achieve the above object, an optical amplifier according to the present invention is an optical amplifier for amplifying signal light propagating in an amplification optical waveguide, comprising: (1) a silica-based first amplification optical waveguide doped with Er (erbium), P (phosphorus), and Al (aluminum) in respective predetermined dopant amounts; (2) a silica-based second amplification optical waveguide doped with Er (erbium) in a predetermined dopant amount; and (3) pumping light supplying means for supplying pumping light of a predetermined wavelength into each of the first amplification optical waveguide and the second amplification optical waveguide, (4) wherein the first amplification optical waveguide and the second amplification optical waveguide are connected in series so that the first amplification optical waveguide is located upstream and the second amplification optical waveguide downstream in a propagating direction of the signal light, and wherein the first amplification optical waveguide and the second amplification optical waveguide amplify the signal light of a predetermined wavelength not less than the wavelength of 1570 nm.

In the above-stated optical amplifier, the amplification optical waveguide as an optical transmission line in the optical amplifier is comprised of at least two amplification optical waveguides each doped with Er, and the P/Al-codoped Er-doped optical waveguide is applied to the upstream optical waveguide. This configuration enables amplification of the signal light at or above the wavelength of 1570 nm and improvement in the noise characteristics in the wavelength band of not less than the wavelength of 1570 nm.

The Er-doped optical waveguide is further connected as the downstream amplification optical waveguide to the upstream P/Al-codoped Er-doped optical waveguide. By the combination of these two amplification optical waveguides, it becomes feasible to suitably set the gain characteristics including the magnitude, flatness, etc. of amplification gain while maintaining the noise characteristics good. The above provides the optical amplifier capable of amplifying the signal light in the signal light wavelength band not less than the wavelength of 1570 nm with good gain characteristics and achieving the improvement in the noise characteristics.

An optical transmission system according to the present invention is characterized by comprising an optical transmission line through which signal light in a predetermined signal light wavelength band is transmitted; and the above-stated optical amplifier, which is placed at a predetermined position on the light transmission line and which amplifies the signal light of a predetermined wavelength not less than the wavelength of 1570 nm propagating in an amplification optical waveguide.

The optical transmission system of this configuration realizes an optical transmission system in which the wavelength band not less than the wavelength of 1570 nm is used as a signal light wavelength band and which is able to satisfactorily transmit the signal light included in the foregoing wavelength band.

Alternatively, an optical transmission system is characterized by comprising an optical transmission line through which signal light in a predetermined signal light wavelength band is transmitted; and an optical amplification system which is placed at a predetermined position on the optical transmission line, wherein the optical amplification system comprises: a first optical amplifier which is the above-stated optical amplifier and which amplifies the signal light of a predetermined wavelength not less than the wavelength of 1570 nm; and a second optical amplifier which is connected in parallel with the first optical amplifier and which amplifies the signal light of a predetermined wavelength less than the wavelength of 1570 nm.

When the second optical amplifier is further connected in parallel with the above-stated optical amplifier as in this configuration, the amplification of the signal light of a wavelength not less than the wavelength of 1570 nm (e.g. the signal light in the L-band wavelength band) and the amplification of the signal light of wavelength less than the wavelength of 1570 nm (e.g. the signal light in the C-band wavelength band) are achieved simultaneously. Thus the optical transmission system for suitably transmitting the signal light in a wide wavelength band is realized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
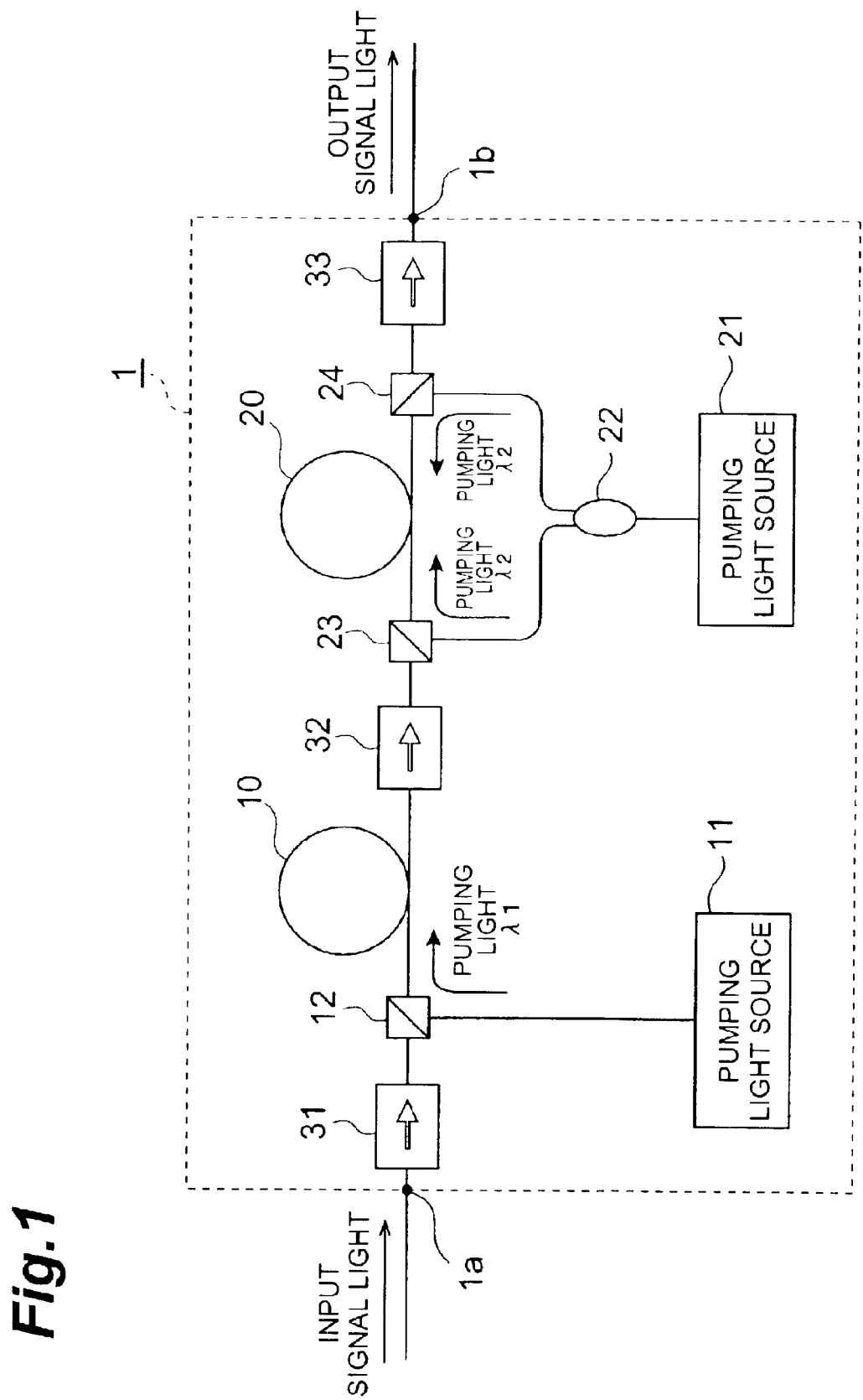
FIG. 1 is a configuration diagram showing a first embodiment of the optical amplifier.

The preferred embodiments of the optical amplifier and the optical transmission system using it according to the present invention will be described below in detail with reference to the drawings. The same reference symbols will denote the same elements throughout the description of the drawings and redundant description will be omitted. It is also noted that the dimensional ratios in the drawings do not always agree with those in the description.

FIG. 1 is a configuration diagram showing a first embodiment of the optical amplifier according to the present invention. The optical amplifier 1 comprises two optical fibers, a first amplification optical fiber 10 of a first amplification optical waveguide and a second amplification optical fiber 20 of a second amplification optical waveguide, as amplification optical waveguides constituting an optical transmission line in the optical amplifier 1.

In the present embodiment, the first amplification optical fiber 10 is a P/Al-codoped Er-doped optical fiber (P/Al-codoped EDF) which is a silica-based optical fiber doped with Er, P, and Al in respective predetermined dopant amounts. The second amplification optical fiber 20 is an Er-doped optical fiber (EDF) which is a silica-based optical fiber doped with Er in a predetermined dopant amount. These P/Al-codoped EDF 10 and EDF 20 both are optical fibers capable of amplifying the signal light in a predetermined signal light wavelength band by pumping light.

These P/Al-codoped EDF 10 and EDF 20 are connected in series so that the P/Al-codoped EDF 10 of the first amplification optical fiber is located upstream and the EDF 20 of the second amplification optical fiber downstream in the propagating direction (a direction indicated by arrows in FIG. 1) of the signal light as an object to be amplified. This configuration constitutes an optical transmission line in the optical amplifier 1 for transmitting the signal light entering an input end 1a, to an output end 1b and amplifying the signal light transmitted.

The propagating direction of the signal light transmitted through the optical transmission line in the optical amplifier 1 consisting of the P/Al-codoped EDF 10 and the EDF 20 is controlled by an optical isolator 31 disposed between the input end 1a and the P/Al-codoped EDF 10, an optical isolator 32 disposed between the P/Al-codoped EDF 10 and the EDF 20, and an optical isolator 33 disposed between the EDF 20 and the output end 1b. Each of the optical isolators 31, 32, 33 allows light to pass in the forward direction (a direction indicated by arrows in the drawing) of the optical transmission line, but does not allow light to pass in the backward direction.

Namely, the optical isolator 31 allows the light coming from the input end 1a of the optical amplifier 1 to pass toward the P/Al-codoped EDF 10, but does not allow light to pass backward. The optical isolator 32 allows the light coming from the P/Al-codoped EDF 10 to pass toward the EDF 20, but does not allow light to pass backward. The optical isolator 33 allows the light coming from the EDF 20 to pass toward the output end 1b of the optical amplifier 1, but does not allow light to pass backward.

A pumping light source 11 for outputting pumping light of a wavelength $\lambda 1$ is mounted as a pumping light supplying means for supplying pumping light of a predetermined wavelength into the P/Al-codoped EDF 10 of the upstream first amplification optical fiber. This pumping light source 11 is connected to the optical transmission line in the optical amplifier 1 by a WDM coupler 12 which is an optical multiplexing means disposed between the optical isolator 31 and the P/Al-codoped EDF 10.

The WDM coupler 12 transmits the signal light coming from the optical isolator 31, to the P/Al-codoped EDF 10 and multiplexes the pumping light supplied from the pumping light source 11 onto the P/Al-codoped EDF 10 in the forward direction. In this configuration, the upstream part including the P/Al-codoped EDF 10 as an amplification optical fiber in the optical amplifier 1 is constructed as a P/Al-codoped EDFA pumped in the forward direction.

On the other hand, a pumping light source 21 for outputting pumping light of a wavelength $\lambda 2$ is mounted as a pumping light supplying means for supplying pumping light of a predetermined wavelength into the EDF 20 of the downstream second amplification optical fiber. This pumping light source 21 is connected via a 3 dB coupler 22 for splitting the output pumping light into two, to the optical transmission line in the optical amplifier 1 by a WDM coupler 23, which is an optical multiplexing means disposed between the optical isolator 32 and the EDF 20, and by a WDM coupler 24, which is an optical multiplexing means disposed between the EDF 20 and the optical isolator 33.

The WDM coupler 23 transmits the signal light coming from the optical isolator 32, to the EDF 20 and multiplexes the pumping light supplied via the coupler 22 from the pumping light source 21, onto the EDF 20 in the forward direction. The WDM coupler 24 transmits the signal light coming from the EDF 20, to the optical isolator 33 and multiplexes the pumping light supplied via the coupler 22 from the pumping light source 21, onto the EDF 20 in the backward direction. In this configuration, the downstream part including the EDF 20 as an amplification optical fiber in the optical amplifier 1 is constructed as an EDFA pumped in two directions.

As described above, the optical amplifier 1 of the present embodiment is an Er-doped fiber amplifier (EDFA) of the two-stage structure in which the upstream P/Al-codoped EDFA of the forwardly pumped structure and the downstream EDFA of the bidirectionally pumped structure are connected in series, as shown in FIG. 1. Particularly, the present optical amplifier 1 is able to amplify the signal light in the wavelength band not less than the wavelength of 1570 nm, propagating in the optical waveguide, by the use of the amplification optical waveguide consisting of the P/Al-codoped EDF 10 and the EDF 20.

In the optical amplifier 1 of the above configuration, when the pumping light sources 11, 21 of the pumping light supplying means output their respective pumping lightwaves of wavelengths $\lambda 1$, $\lambda 2$, the output pumping lightwaves are supplied into the respective P/Al-codoped EDF 10 and EDF 20 of amplification optical fibers. When the signal light at or above the wavelength of 1570 nm is fed from an optical transmission line connected to the input end 1a of the optical amplifier 1, via the optical isolator 31 into the optical amplifier 1 in a state in which the pumping lightwaves of the predetermined wavelengths are supplied into the amplification optical fibers as described above, this signal light is amplified in order by the upstream P/Al-codoped EDF 10 and by the downstream EDF 20. Then the signal light thus amplified is outputted through the optical isolator 33 from the output end 1b.

In the optical amplifier 1 in the present embodiment, the amplification optical waveguides forming the optical transmission line in the optical amplifier 1 are comprised of the two-stage amplification optical fibers 10, 20 each doped with Er and the P/Al-codoped EDF is applied to the upstream optical fiber 10. This enables the amplification of the signal light at or above the wavelength of 1570 nm and the improvement in the noise characteristics in the wavelength band not less than the wavelength of 1570 nm, as described hereinafter.

The EDF 20 is further connected as the downstream amplification optical fiber to the upstream P/Al-codoped EDF 10. These two amplification optical fibers 10 and 20 are combined to constitute the amplification optical waveguide of the two-stage structure as a whole, whereby it becomes feasible to suitably set the gain characteristics including the magnitude, flatness, etc. of amplification gain while maintaining the noise characteristics good as described above. The above realizes the optical amplifier 1 capable of amplifying the signal light in the signal light wavelength band not less than the wavelength of 1570 nm with good gain characteristics and achieving the improvement in the noise characteristics thereof.

In this embodiment, the pumping light source 21 for the downstream EDF 20 supplies the pumping light into the EDF 20 via the WDM coupler 23 disposed between the P/Al-codoped EDF 10 and the EDF 20 as the optical multiplexing means.

In this configuration, in the longitudinal direction of the optical fiber, uniformity of the population inversion in the amplification optical fiber can be improved. The above realizes the optical amplifier 1 capable of amplifying the signal light with the amplification wavelength band of the L-band wavelength band in a preferable manner, regardless of absorption of the pumping light.

In addition, the optical isolator 32 is placed between the P/Al-codoped EDF 10 and the EDF 20, as the optical device which has an attenuation ratio for light propagating in a backward direction of the propagating direction of the signal light larger than that for light propagating in the propagating direction of the signal light. In the EDFA with the amplification wavelength band being the L-band wavelength band, the amplified spontaneous emission (ASE) within the C-band wavelength band is generated, and the problem may occur such as saturation of the EDF. In regard to this, when the optical device such as the optical isolator 32 is placed between the P/Al-codoped EDF 10 and the EDF 20, the ASE propagating in the optical fiber can be reduced.

The amplification characteristics of signal light in the optical amplifier 1 in the embodiment shown in FIG. 1 will be specifically described below.

Figure 2A:
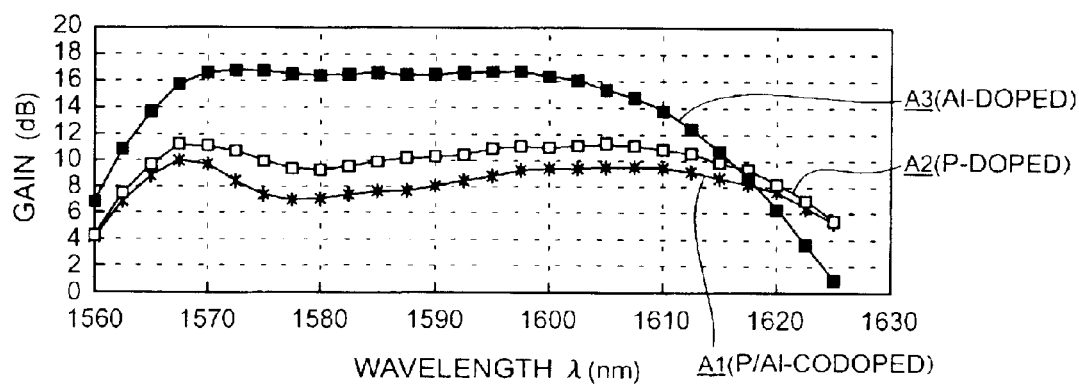
FIGS. 2A and 2B are graphs showing (A) the gain characteristics and (B) the noise characteristics of various EDFs in the wavelength band not less than the wavelength of 1570 nm.
Figure 2B:
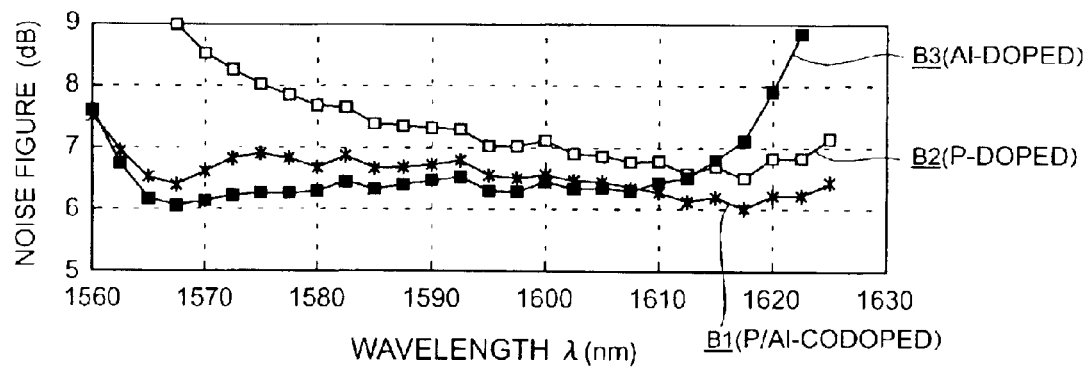

FIGS. 2A and 2B are graphs showing the amplification characteristics of various EDFs in the wavelength band of not less than the wavelength of 1570 nm including the L-band wavelength band. In this case, the various EDFs for comparison of the amplification characteristics are assumed to be three types of Er-doped optical fibers: (1) P/Al-codoped EDF; (2) P-doped EDF; and (3) Al-doped EDF, and for each of these EDFs, the amplification characteristics are investigated under the supply condition of the 1.48 $\mu$m-wavelength-band pumping light.

Here, concerning the signal light wavelength band, the L-band (Long-wavelength band) wavelength band is a wavelength band of wavelengths from 1570 to 1600 nm, for example. The C-band (Conventional band) wavelength band is a wavelength band of wavelengths from 1530 to 1565 nm, for example. The S-band (Short-wavelength band) wavelength band is a wavelength band of wavelengths from 1460 to 1530 nm, for example.

Among these wavelength bands, the L-band wavelength band is included in the wavelength band of wavelengths not less than 1570 nm. The C-band wavelength band and the S-band wavelength band are included in the wavelength band of wavelengths less than 1570 nm. Note that the shortest wavelength and the longest wavelength of the respective wavelength band vary corresponding to the configuration and the like of the respective optical transmission system, for example, the shortest wavelength of the signal light in the L-band wavelength band is set to 1574 nm.

FIG. 2A is a graph showing the gain characteristics of the respective EDFs for the signal light in the wavelength band not less than the wavelength of 1570 nm, in which the horizontal axis represents the wavelength $\lambda$ (nm) of the signal light and the vertical axis the gain (dB) of amplification. In this graph, a plot A1 indicates the gain characteristics in the P/Al-codoped EDF, a plot A2 the gain characteristics in the P-doped EDF, and a plot A3 the gain characteristics in the Al-doped EDF.

FIG. 2B is a graph showing the noise characteristics of the respective EDFs for the signal light in the wavelength band not less than the wavelength of 1570 nm, in which the horizontal axis represents the wavelength $\lambda$ (nm) of the signal light and the vertical axis the noise figure (NF, dB) in amplification. In this graph, a plot B1 indicates the noise characteristics in the P/Al-codoped EDF, a plot B2 the noise characteristics in the P-doped EDF, and a plot B3 the noise characteristics in the Al-doped EDF.

Concerning these characteristics of the respective EDFs, first comparing the amplification characteristics (plots A1, B1) in the P/Al-codoped EDF with the amplification characteristics (plots A2, B2) in the P-doped EDF, there is no big difference in the gain characteristics between the two gain spectra in the wavelength band not less than the wavelength of 1570 nm. On the other hand, as to the noise characteristics, the P-doped EDF without being codoped with Al demonstrates degradation of the noise figure on the short wavelength side including the vicinity of the wavelength of 1570 nm, whereas the P/Al-codoped EDF provides good noise characteristics throughout the entire wavelength band.

By comparing the amplification characteristics (plots A1, B1) in the P/Al-codoped EDF with those (plots A3, B3) in the Al-doped EDF, it is shown as to the gain characteristics that the Al-doped EDF exhibits greater gain in the wavelength band not less than the wavelength of 1570 nm. However, the Al-doped EDF demonstrates a great drop in the gain on the long wavelength side over the wavelength of 1600 nm, whereas the P/Al-codoped EDF provides stable gain up to the long wavelength side.

As for the noise characteristics, the Al-doped EDF reveals sudden degradation of the noise characteristics on the long wavelength side, whereas the P/Al-codoped EDF maintains small noise figure stably up to the long wavelength side. It is thus verified that the amplification characteristics in the Al-doped EDF are heavily degraded about the gain characteristics and the noise characteristics both on the long wavelength side. The reason for it is that the absorption cross section of excited state absorption (ESA) in the Al-doped EDF suddenly increases in the wavelength band not less than the wavelength of 1600 nm (cf. Document 1).

The above proves that the P/Al-codoped EDF provides the good noise characteristics on the short wavelength side, as compared with the P-doped EDF. In addition, it provides the good amplification characteristics with little influence of ESA on the long wavelength side, as compared with the Al-doped EDF. Accordingly, as previously described about the optical amplifier 1 of FIG. 1, when the P/Al-codoped EDF is applied to the upstream amplification optical waveguide in the two-stage structure, it becomes feasible to amplify the signal light in the wavelength band not less than the wavelength of 1570 nm with good gain characteristics and noise characteristics throughout the wide wavelength band. When the EDF is further connected downstream to the P/Al-codoped EDF, the total gain characteristics can be suitably set.

Figure 3:
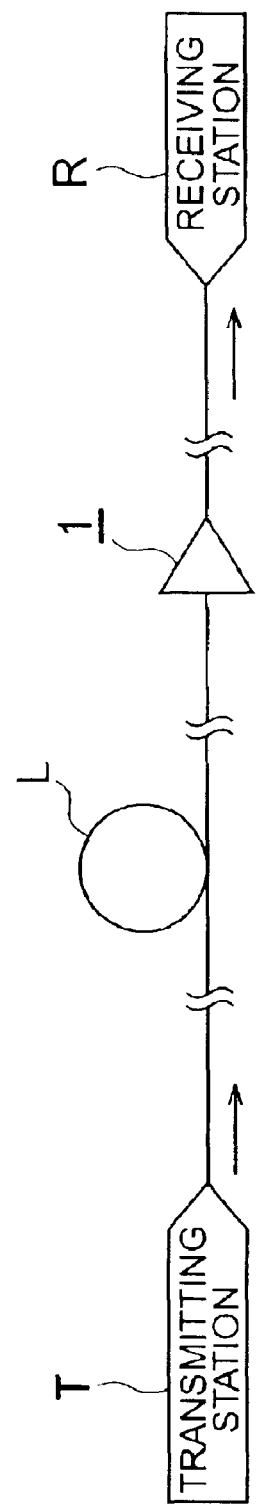
FIG. 3 is a configuration diagram showing an embodiment of the optical transmission system using the optical amplifier shown in FIG. 1.

The following will describe an optical transmission system according to the present invention, which uses the optical amplifier of the above-stated configuration. FIG. 3 is a configuration diagram showing an embodiment of the optical transmission system using the optical amplifier shown in FIG. 1. The present optical transmission system comprises a transmitting station (transmitter) T for transmitting signal light in a predetermined signal light wavelength band, an optical fiber transmission line L which is an optical transmission line for transmitting the signal light from the transmitting station T, and a receiving station (receiver) R for receiving the signal light transmitted through the optical fiber transmission line L.

The optical amplifier 1 of the structure shown in FIG. 1 is installed at a predetermined position on the optical fiber transmission line L. The optical amplifier 1 amplifies the signal light transmitted through the optical fiber transmission line L, by pumping light and, particularly, amplifies the signal light in the wavelength band of not less than the wavelength of 1570 nm including the L-band wavelength band. The optical amplifier 1 of this type is installed, for example, in a relay station provided in the optical transmission system.

The optical transmission system incorporating the optical amplifier of the foregoing configuration as described above realizes an optical transmission system in which the wavelength band not less than the wavelength of 1570 nm is used as a signal light wavelength band and which is able to satisfactorily transmit the signal light included in the wavelength band.

Further detailed investigation will be discussed about the characteristics, preferred configuration conditions, etc. of the optical amplifier according to the present invention in the above-stated configuration.

Figure 4A:
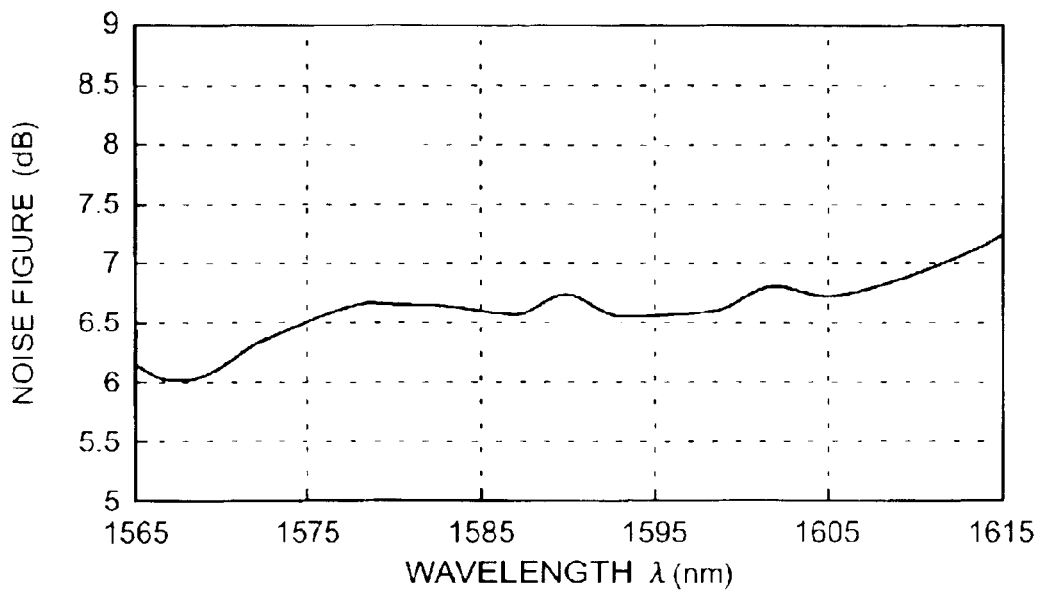
FIGS. 4A and 4B are graphs showing the wavelength dependence of noise figure with supply of pumping light (A) in the 0.98 $\mu$m wavelength band and (B) in the 1.48 $\mu$m wavelength band in the optical amplifier shown in FIG. 1.
Figure 4B:
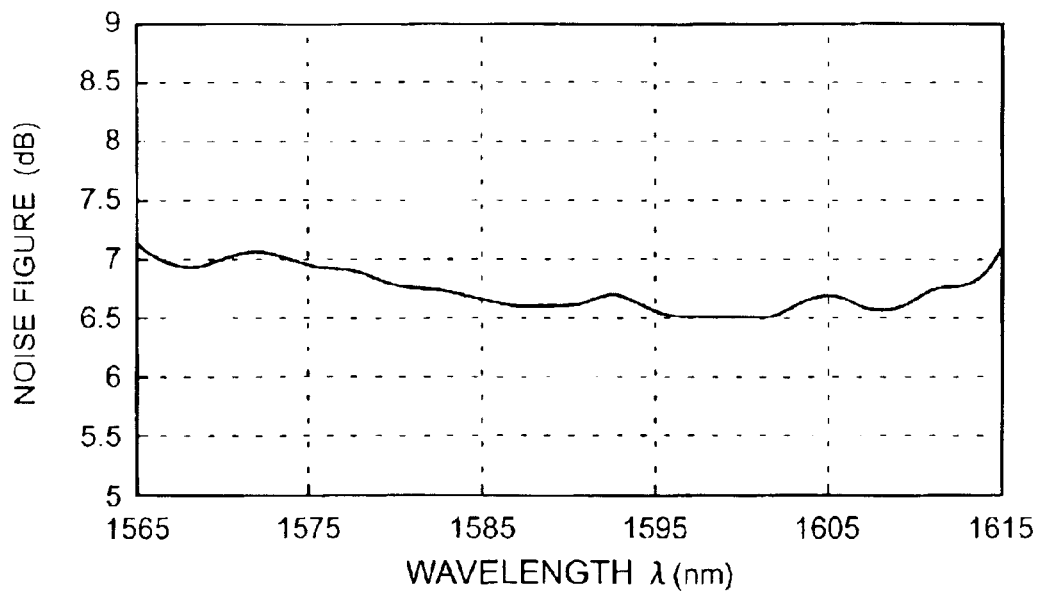

The first discussion will involve the investigation on the pumping light supplied into the P/Al-codoped EDF used as the upstream first amplification optical fiber 10. FIGS. 4A and 4B are graphs showing the wavelength dependence of noise figure NF in the optical amplifier of the two-stage structure shown in FIG. 1, in which the horizontal axis represents the wavelength λ (nm) of the signal light and the vertical axis the noise figure (dB).

In this case, the EDF 20 connected downstream of the P/Al-codoped EDF 10 is a P/Al-codoped EDF similar to the upstream one. This composes the optical amplifier 1 of the two-stage P/Al-codoped EDFAs having the amplification wavelength band in the wavelength band of not less than the wavelength of 1570 nm including the L-band wavelength band.

The graph shown in FIG. 4A presents the noise characteristics of the optical amplifier 1 obtained when the 0.98 μm-wavelength-band pumping light from the pumping light source 11 is supplied into the upstream P/Al-codoped EDF 10 and the 1.48 μm-wavelength-band pumping light from the pumping light source 21 is supplied into the downstream P/Al-codoped EDF 20. The unsaturated absorptions of the P/Al-codoped EDFs 10, 20 are set at 210 dB and at 690 dB, respectively.

On the other hand, the graph shown in FIG. 4B presents the noise characteristics of the optical amplifier 1 obtained when the 1.48 μm-wavelength-band pumping light from the pumping light source 11 is supplied into the upstream P/Al-codoped EDF 10 and the 1.48 μm-wavelength-band pumping light from the pumping light source 21 is supplied into the downstream P/Al-codoped EDF 20. The unsaturated absorptions of the P/Al-codoped EDFs 10, 20 are set at 270 dB and at 770 dB, respectively.

It is generally known about the ordinary EDFAs with the amplification wavelength band in the C-band wavelength band and the Al-doped EDFAs with the amplification wavelength band in the L-band wavelength band that better noise characteristics are obtained in the case of the 0.98 μm-wavelength-band pumping light being supplied as the pumping light into the amplification EDF than in the case of the 1.48 μm-wavelength-band pumping light being supplied. In contrast to it, when comparison is made between the graphs of the noise characteristics shown in FIGS. 4A and 4B, it is seen that the P/Al-codoped EDFA shown in FIG. 1 using the P/Al-codoped EDF as a amplification optical fiber demonstrates degradation of the noise figure in the wavelength band not less than the wavelength of 1570 nm in the use of the 0.98 μm-band pumping light to the contrary.

This is conceivably because it is necessary in the P/Al-codoped EDFA as described to increase the unsaturated absorption of the P/Al-codoped EDF in order to secure sufficient gain for the amplification of the signal light in the L-band wavelength band, so that the pumping light supplied is completely absorbed during the propagation through the long EDF. The unsaturated absorption of the P/Al-codoped EDF is approximately 1.5 times greater than that in the case of the Al-doped EDF being used.

For this reason, it is preferable to use the 1.48 μm-wavelength-band pumping light as the pumping light to be supplied into the P/Al-codoped EDF and, particularly, as the pumping light to be supplied into the upstream P/Al-codoped EDF 10 whose primary importance is the noise characteristics. When the upstream P/Al-codoped EDF 10 is pumped by the use of the pumping light of the wavelength as described, the pumping efficiency by the pumping light is enhanced. Since the enhancement of pumping efficiency permits amplification of the signal light at high efficiency, the degradation of noise figure can be prevented in the whole of the optical amplifier 1.

For example, the two-stage EDFA using as the upstream amplification optical fiber the P/Al-codoped EDF under supply of the 1.48 μm-wavelength-band pumping light as described above is able to maintain good noise characteristics throughout the wide wavelength band up to the long-wavelength-side signal light wavelength band over 1610 nm, as compared with the two-stage EDFA using as the upstream amplification optical fiber the Al-doped EDF under supply of the 0.98 μm-wavelength-band pumping light.

Figure 5:
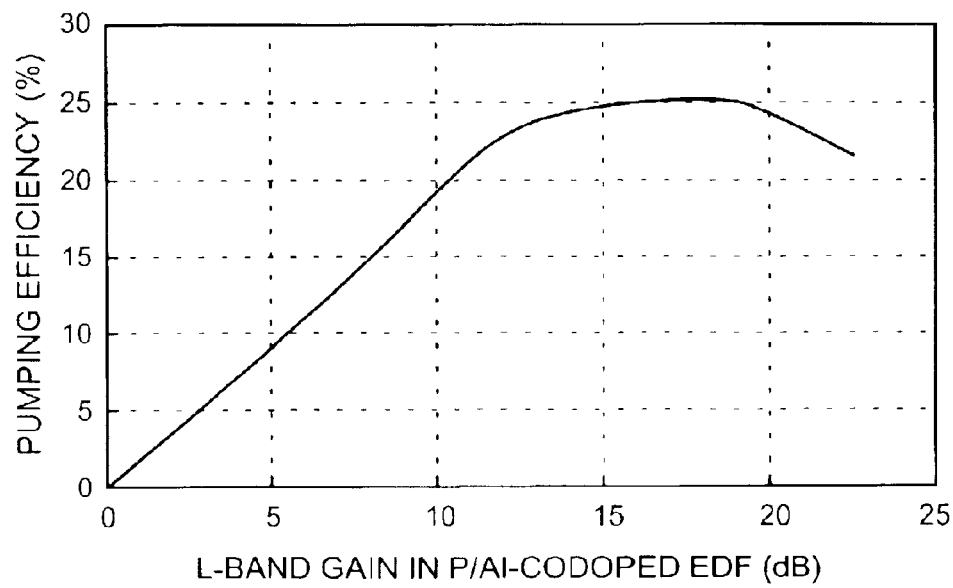
FIG. 5 is a graph showing the gain dependence of pumping efficiency in the configuration using the P/Al-codoped EDF in a single stage.
Figure 6:
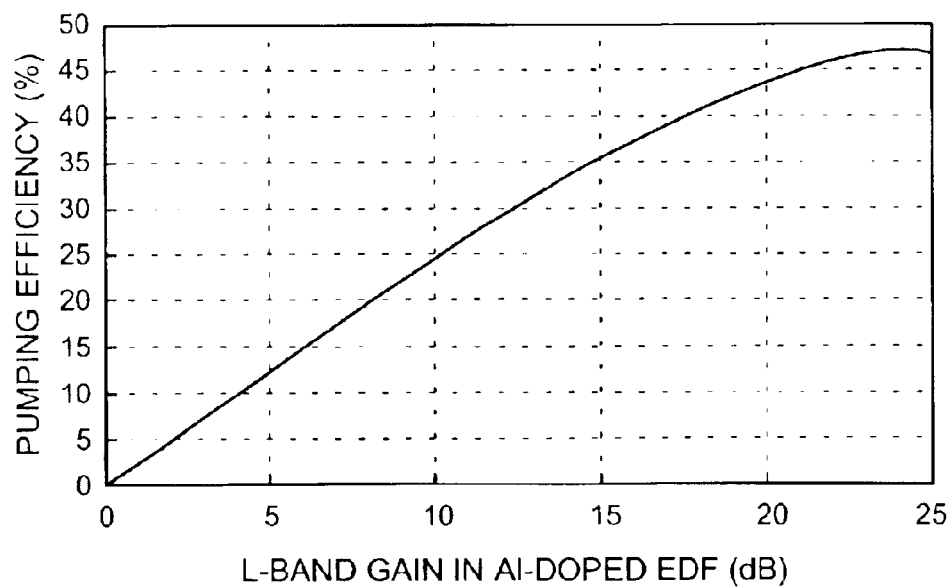
FIG. 6 is a graph showing the gain dependence of pumping efficiency in the configuration using the Al-doped EDF in a single stage.

The following discussion will be investigation on the downstream EDF connected in series to the upstream P/Al-codoped EDF. FIG. 5 is a graph showing the gain dependence of pumping efficiency in a configuration using a P/Al-codoped EDF in a single stage. FIG. 6 is a graph showing the gain dependence of pumping efficiency in a configuration using an Al-doped EDF in a single stage. In these graphs of FIG. 5 and FIG. 6, the horizontal axis represents the amplification gain (dB) in the L-band wavelength band and the vertical axis the pumping efficiency (%). For the signal light as an object to be amplified, the total input signal light power is set at −2 dBm.

Here the amplification gain in the L-band wavelength band (here, the wavelength band of wavelengths from 1570 to 1600 nm) on the horizontal axis of each graph represents average gain values of all gains at signal light of respective wavelengths in the signal light wavelength band of the L-band. The pumping efficiency on the vertical axis of each graph represents values obtained when the 1.48 μm-wavelength-band pumping light is supplied into the EDF in the bidirectionally pumped structure. In the L-band EDFA with the amplification wavelength band being the L-band wavelength band, it is preferable about the population inversion in the EDF of the amplification optical fiber that the population inversion be kept as uniform as possible in the longitudinal direction of the EDF in order to enhance the pumping efficiency; in this respect, the aforementioned bidirectional pumping is considered to be a preferred pumping method.

Comparing the graph of pumping efficiency shown in FIG. 5, obtained through the use of the P/Al-codoped EDF, with the graph of pumping efficiency shown in FIG. 6, obtained through the use of the Al-doped EDF, the pumping efficiencies obtained through the use of the Al-doped EDF are about 1.8 times higher than those obtained through the use of the P/Al-codoped EDF, under the pumping conditions optimized for each of these two types of EDFs. On the other hand, for applying the Al-doped EDF as an amplification optical fiber, it is necessary to take it into consideration that the Al-doped EDF is greatly affected by ESA on the long wavelength side to decrease the gain and degrade the noise characteristics, as described previously.

In the optical amplifier provided with the amplification optical waveguides in the two-stage configuration, the noise characteristics out of the amplification characteristics are relatively important for the upstream first amplification optical waveguide, because noise light produced therein is amplified in the downstream second amplification optical waveguide. On the other hand, the gain characteristics out of the amplification characteristics are relatively important for the downstream second amplification optical waveguide, because it is necessary to secure satisfactory total amplification gain of the optical amplifier.

In the optical amplifier 1 in the configuration shown in FIG. 1, therefore, it is preferable to use the P/Al-codoped EDF with excellent noise characteristics as described above, as the upstream first amplification optical fiber 10. It is also preferable to use the Al-doped EDF without being doped with P, which demonstrates the high pumping efficiency and excellent pumping characteristics, as the downstream second amplification optical fiber 20. By applying the Al-doped EDF as the downstream amplification optical waveguide in this way, it becomes feasible to ensure the high pumping efficiency and the satisfactorily large total amplification gain of the optical amplifier 1. At the same time, it is also feasible to maintain the noise characteristics of the optical amplifier 1 good.

This downstream second amplification optical fiber 20 can be any other type of EDF than the Al-doped EDF, depending upon conditions such as the magnitude of amplification gain and others necessary for the whole of the optical amplifier 1. For example, where the noise characteristics are more important as a whole than the gain characteristics, it is possible to employ a configuration using the P/Al-codoped EDF similar to the upstream one, as the downstream EDF. For configurations wherein the amplification optical waveguide in the optical amplifier is comprised of three or more stages of optical waveguides, it is preferable to employ the Al-doped EDF as a final-stage EDF, in order to prevent the degradation of noise characteristics.

The amplification gain in the L-band wavelength band on the horizontal axis in the graphs of FIG. 5 and FIG. 6 is proportional to the unsaturated absorption of EDF. Concerning this amplification gain, the graph of pumping efficiency shown in FIG. 5 in the case of the P/Al-codoped EDF being used shows that with increase in the gain, the pumping efficiency decreases conversely in the region where the gain exceeds a certain value.

Namely, in the case of the P/Al-codoped EDF having a short fiber length, a sufficient pumping efficiency is not yielded, because of increase in the ratio of pumping light passing through the fiber without being used for the pumping in the EDF among the supplied pumping light. In the case of the P/Al-codoped EDF having a too long fiber length on the other hand, the pumping efficiency is degraded to the contrary, because of increase in the length of the fiber part turning to absorb the light. For this reason, where the P/Al-codoped EDF is used as an amplification optical fiber, it is preferable to set the unsaturated absorption of the P/Al-codoped EDF at an appropriate value in consideration of the resultant pumping efficiency.

The unsaturated absorption of the P/Al-codoped EDF is dependent upon the input signal light power in a strict sense, and at or after the first-stage amplification optical fiber, the input signal light power of the signal light as an object to be amplified is typically around −2 dBm or above it. Accordingly, judging from the gain dependence of pumping efficiency in the graph of FIG. 5 where the input signal light power is set at −2 dBm, if 0.6 dB is allowed for the degradation from the maximum of pumping efficiency, the unsaturated absorption peak of the P/Al-codoped EDF of the upstream first amplification optical waveguide is preferably not more than 760 dB, where the maximum thereof is 760 dB.

Further, if 0.1 dB is allowed for the degradation from the maximum of pumping efficiency, the unsaturated absorption peak of the P/Al-codoped EDF is preferably not more than 650 dB, where the maximum thereof is 650 dB. By setting the unsaturated absorption peak at a value within this range, the pumping efficiency can be suitably maintained in the P/Al-codoped EDF.

Among the above two conditions, the condition that the tolerance for the degradation from the maximum of pumping efficiency is 0.6 dB and the unsaturated absorption peak is not more than 760 dB is in a permissible range unless Wear-Out deterioration of pumping LD and the like is assumed. The condition that the tolerance for the degradation from the maximum of pumping efficiency is 0.1 dB and the unsaturated absorption peak is not more than 650 dB is in a permissible range from decrease of splicing loss between different types of optical fibers, an EDF and an ordinary optical fiber, the range of variations in loss in optical components, and so on. It is thus preferable to apply the latter condition that the unsaturated absorption peak is not more than 650 dB, for example, to the optical transmission system required to have a long lifetime of 25 years or so.

Figure 7:
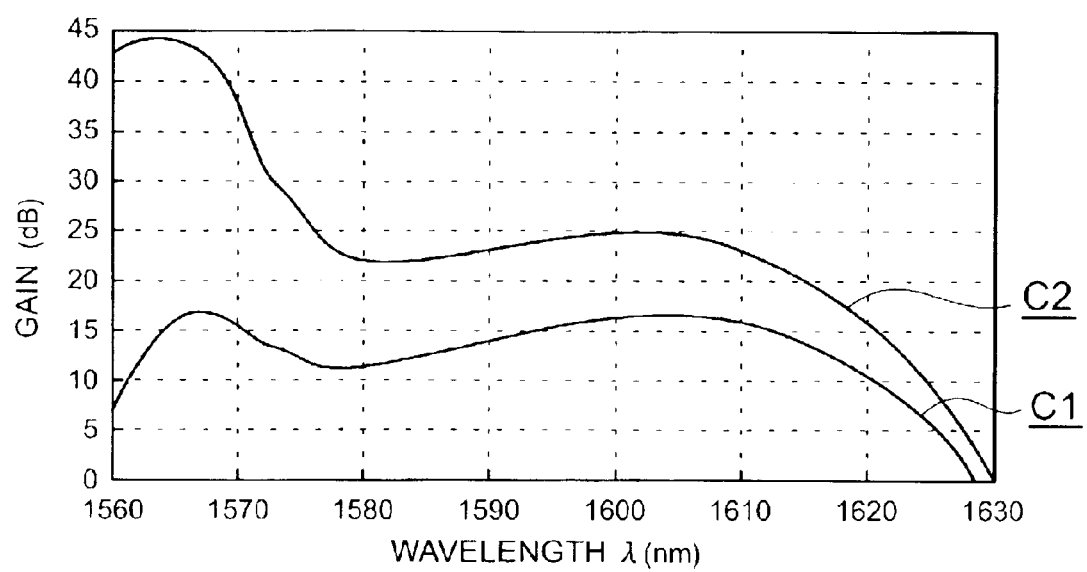
FIG. 7 is a graph showing the wavelength dependence of gain in the configuration using the P/Al-codoped EDF in a single stage.

The following discussion will provide investigation on gain deviation in the optical amplifier using the P/Al-codoped EDF as an amplification optical fiber. FIG. 7 is a graph showing the wavelength dependence of gain in the configuration using the P/Al-codoped EDF in a single stage, in which the horizontal axis represents the wavelength λ (nm) of the signal light and the vertical axis the amplification gain (dB).

When the signal light is amplified using the P/Al-codoped EDF as an amplification optical waveguide, a gain spectrum indicating the wavelength dependence of amplification gain in the wavelength band not less than the wavelength of 1570 nm has two gain peaks (maximum gain values), a peak near the wavelength of 1570 nm and a peak near the wavelength of 1600 nm. For this reason, the gain deviation in the wavelength band becomes relatively large in the amplification of the signal light in the L-band wavelength band through the use of the P/Al-codoped EDF.

In the graph of FIG. 7, a plot C1 shows a gain spectrum obtained when the population inversion in the EDF is adjusted so as to equalize the gain values at the two gain peaks near the wavelength of 1570 nm and near the wavelength of 1600 nm with each other. For example, the gain deviation in the L-band wavelength band through the use of the Al-doped EDF is approximately 3% as relative gain deviation, whereas the gain deviation is approximately 30% in the use of the P/Al-codoped EDF, as indicated by the plot C1 (cf. Document 1).

In contrast to it, a plot C2 indicates a gain spectrum obtained when increase of gain is allowed in the wavelength region on the wavelength side shorter than the wavelength of 1570 nm. In this example, specifically, the wavelength band is assumed to be a range in which the shortest wavelength is 1574 nm and the longest wavelength is 1614 nm shorter than 1620 nm, corresponding to the wavelength band commonly used as a signal light wavelength band, and the population inversion in the EDF is adjusted so that the gain is most flattened in the foregoing wavelength band.

In the gain spectrum indicated by this plot C2 the relative gain deviation is reduced to about half in the wavelength band of wavelengths from 1574 nm to 1614 nm, as compared with the gain spectrum indicated by the plot C1. By setting the gain characteristics by the P/Al-codoped EDF in this way, it is feasible to attain the gain characteristics with good flatness in the wavelength band used as a signal light wavelength band not less than the wavelength of 1570 nm. Further, when the flatness of gain is improved in this way, it is feasible to suppress peak loss of a gain equalizer and, at the same time, to improve the pumping efficiency and the noise characteristics.

Concerning this setting of the gain spectrum in the P/Al-codoped EDF of the upstream first amplification optical fiber, it is preferable in general that the population inversion in the P/Al-codoped EDF be set so that the gain spectrum is most flattened in the wavelength band where the shortest wavelength is 1574 nm and the longest wavelength is a predetermined wavelength (1614 nm in the above example) shorter than 1620 nm.

In the case wherein the L-band EDFA in which the population inversion in the P/Al-codoped EDF of the amplification optical fiber is set as described above, is used in parallel with the EDFA such as the C-band EDFA, the system performance can be possibly degraded by residual gain in the wavelength band of wavelengths not more than 1565 nm (e.g. the C-band wavelength band of wavelengths from 1530 to 1565 nm).

For this reason, in an optical amplification system using the L-band EDFA and the EDFA such as the C-band EDFA in parallel, it is preferable to locate an optical filter for removing light in a wavelength band of wavelengths not more than 1565 nm (e.g. an optical filter for removing light in the C-band wavelength band), at a predetermined position on the optical transmission line between the input end and the output end of the optical amplification system. This permits the signal light in the wavelength band of wavelengths not more than 1565 nm to be separated well from the signal light in the L-band wavelength band, whereby the signal light in the wavelength band not less than the wavelength of 1570 nm can be satisfactorily amplified.

When the gain spectrum indicated by the plot C2 is applied, in which the population inversion in the EDF is adjusted so that the gain is most flattened in the wavelength band with the shortest wavelength of 1574 nm as stated above, increase of gain occurs in the wavelength region on the shorter wavelength side. In this case, it is preferable to locate an optical filter for removing light in a wavelength band of wavelengths not more than 1575 nm (e.g. an optical filter for removing light in the wavelength band of wavelengths from 1530 to 1575 nm), at a predetermined position on the optical transmission line. Detailed description on the configuration and the like of the optical filter will be given later.

Figure 8:
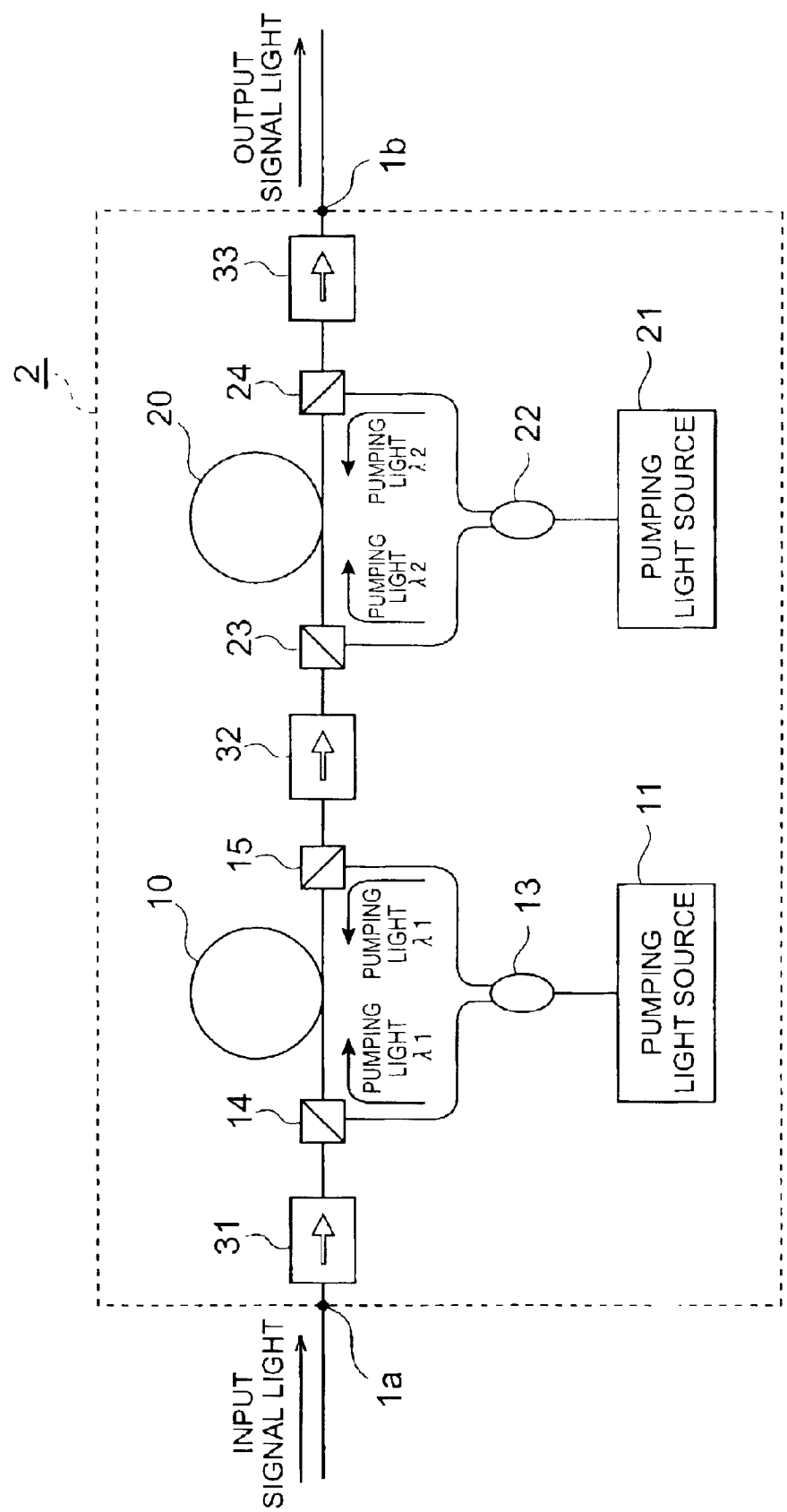
FIG. 8 is a configuration diagram showing a second embodiment of the optical amplifier.

FIG. 8 is a configuration diagram showing a second embodiment of the optical amplifier according to the present invention. The optical amplifier 2 comprises two optical fibers, as the optical amplifier 1 shown in FIG. 1, the upstream P/Al-codoped EDF 10 of the first amplification optical fiber, and the downstream EDF 20 of the second amplification optical fiber, as amplification optical waveguides constituting an optical transmission line in the optical amplifier 2.

The propagating direction of the signal light transmitted through the optical transmission line in the optical amplifier 2 consisting of the P/Al-codoped EDF 10 and the EDF 20 is controlled by an optical isolator 31 disposed between the input end 1a and the P/Al-codoped EDF 10, an optical isolator 32 disposed between the P/Al-codoped EDF 10 and the EDF 20, and an optical isolator 33 disposed between the EDF 20 and the output end 1b. Each of the optical isolators 31, 32, 33 allows light to pass in the forward direction of the optical transmission line, but does not allow light to pass in the backward direction.

A pumping light source 11 for outputting pumping light of a wavelength λ1 is mounted as a pumping light supplying means for supplying pumping light of a predetermined wavelength into the P/Al-codoped EDF 10 of the upstream first amplification optical fiber. This pumping light source 11 connected via a 6 dB coupler 13 for splitting the output pumping light into two, to the optical transmission line in the optical amplifier 2 by a WDM coupler 14, which is an optical multiplexing means disposed between the optical isolator 31 and the P/Al-codoped EDF 10, and by a WDM coupler 15, which is an optical multiplexing means disposed between the P/Al-codoped EDF 10 and the optical isolator 32.

In this configuration, in the two pumping light outputs from the 6 dB coupler 13, the output with a larger splitting ratio is input into the upstream WDM coupler 14, and the output with a smaller splitting ratio is input into the downstream WDM coupler 15, respectively.

The WDM coupler 14 transmits the signal light coming from the optical isolator 31, to the P/Al-codoped EDF 10 and multiplexes the pumping light supplied via the coupler 13 from the pumping light source 11, onto the P/Al-codoped EDF 10 in the forward direction. The WDM coupler 15 transmits the signal light coming from the P/Al-codoped EDF 10, to the optical isolator 32 and multiplexes the pumping light supplied via the coupler 13 from the pumping light source 11, onto the P/Al-codoped EDF 10 in the backward direction. In this configuration, the upstream part including the P/Al-codoped EDF 10 as an amplification optical fiber in the optical amplifier 2 is constructed as an P/Al-codoped EDFA pumped in two directions.

On the other hand, a pumping light source 21 for outputting pumping light of a wavelength λ2 is mounted as a pumping light supplying means for supplying pumping light of a predetermined wavelength into the EDF 20 of the downstream second amplification optical fiber. This pumping light source 21 is connected via a 3 dB coupler 22 for splitting the output pumping light into two, to the optical transmission line in the optical amplifier 2 by a WDM coupler 23, which is an optical multiplexing means disposed between the optical isolator 32 and the EDF 20, and by a WDM coupler 24, which is an optical multiplexing means disposed between the EDF 20 and the optical isolator 33.

The WDM coupler 23 transmits the signal light coming from the optical isolator 32, to the EDF 20 and multiplexes the pumping light supplied via the coupler 22 from the pumping light source 21, onto the EDF 20 in the forward direction. The WDM coupler 24 transmits the signal light coming from the EDF 20, to the optical isolator 33 and multiplexes the pumping light supplied via the coupler 22 from the pumping light source 21, onto the EDF 20 in the backward direction. In this configuration, the downstream part including the EDF 20 as an amplification optical fiber in the optical amplifier 2 is constructed as an EDFA pumped in two directions.

As described above, the optical amplifier 2 of the present embodiment is an EDFA of the two-stage structure in which the upstream P/Al-codoped EDFA of the bidirectionally pumped structure and the downstream EDFA of the bidirectionally pumped structure are connected in series, as shown in FIG. 8. Particularly, the present optical amplifier 2 is able to amplify the signal light in the wavelength band not less than the wavelength of 1570 nm, propagating in the optical waveguide, by the use of the amplification optical waveguide consisting of the P/Al-codoped EDF 10 and the EDF 20.

In the optical amplifier 2 of the above configuration, when the pumping light sources 11, 21 of the pumping light supplying means output their respective pumping lightwaves of wavelengths λ1, λ2, the output pumping lightwaves are supplied into the respective P/Al-codoped EDF 10 and EDF 20 of amplification optical fibers. When the signal light at or above the wavelength of 1570 nm is fed from an optical transmission line connected to the input end 1a of the optical amplifier 2, via the optical isolator 31 into the optical amplifier 2 in a state in which the pumping lightwaves of the predetermined wavelengths are supplied into the amplification optical fibers as described above, this signal light is amplified in order by the upstream P/Al-codoped EDF 10 and by the downstream EDF 20. Then the signal light thus amplified is outputted through the optical isolator 33 from the output end 1b.

In the optical amplifier 2 in the present embodiment, as in the optical amplifier 1 shown in FIG. 1, the amplification optical waveguides forming the optical transmission line in the optical amplifier 2 are comprised of the two-stage amplification optical fibers 10, 20 each doped with Er and the P/Al-codoped EDF is applied to the upstream optical fiber 10. This enables the amplification of the signal light at or above the wavelength of 1570 nm and the improvement in the noise characteristics in the wavelength band not less than the wavelength of 1570 nm.

The EDF 20 is further connected as the downstream amplification optical fiber to the upstream P/Al-codoped EDF 10. These two amplification optical fibers 10 and 20 are combined to constitute the amplification optical waveguide of the two-stage structure as a whole, whereby it becomes feasible to suitably set the gain characteristics including the magnitude, flatness, etc. of amplification gain while maintaining the noise characteristics good as described above. The above realizes the optical amplifier 2 capable of amplifying the signal light in the signal light wavelength band not less than the wavelength of 1570 nm with good gain characteristics and achieving the improvement in the noise characteristics thereof.

In this embodiment, the pumping light source 11 for the upstream P/Al-codoped EDF 10 supplies the pumping light into the P/Al-codoped EDF 10 via the WDM coupler 15 disposed between the P/Al-codoped EDF 10 and the EDF 20 as the optical multiplexing means. Further, the pumping light source 21 for the downstream EDF 20 supplies the pumping light into the EDF 20 via the WDM coupler 23 disposed between the P/Al-codoped EDF 10 and the EDF 20 as the optical multiplexing means.

In this configuration, in the longitudinal direction of the optical fiber, uniformity of the population inversion in the amplification optical fiber can be improved. The above realizes the optical amplifier 2 capable of amplifying the signal light with the amplification wavelength band of the L-band wavelength band in a preferable manner, regardless of absorption of the pumping light.

As for the specific configuration for supplying the pumping light via the optical multiplexing means disposed between the P/Al-codoped EDF 10 and the EDF 20, the configuration designed with the unsaturated absorptions of the EDFs 10, 20, and the input/output powers being considered is preferably used. For example, In the case that the unsaturated absorption of the upstream P/Al-codoped EDF 10 is about 210 dB and relatively small, the configuration of the optical amplifier 1 shown in FIG. 1 is preferably used.

Figure 9:
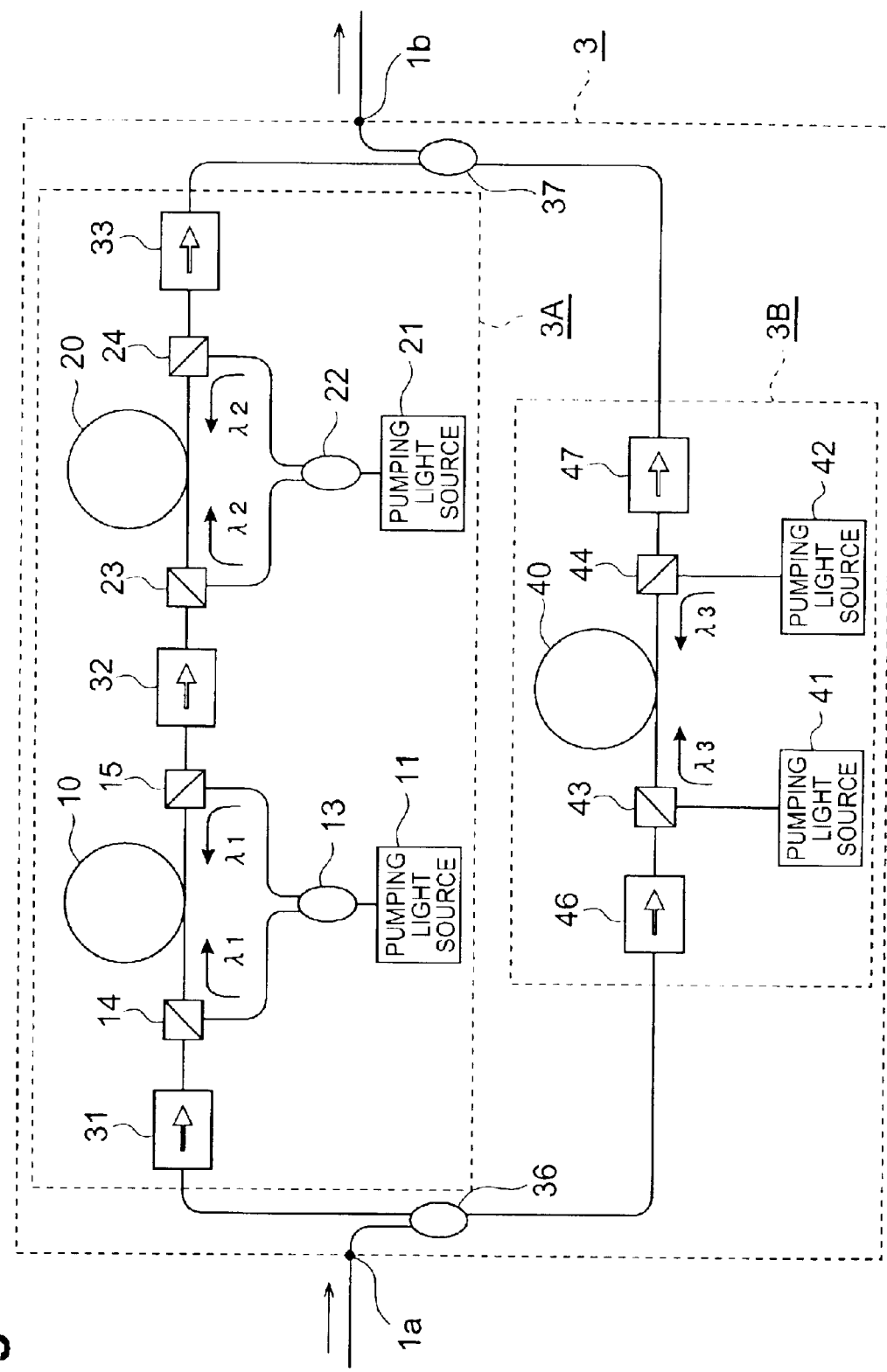
FIG. 9 is a configuration diagram showing a third embodiment of the optical amplifier.

FIG. 9 is a configuration diagram showing a third embodiment of the optical amplifier according to the present invention. The optical amplifier 3 comprises a first optical amplification unit 3A, as a optical amplification unit for amplifying the signal light of a predetermined wavelength not less than the wavelength of 1570 nm. Further, the optical amplifier 3 comprises a second optical amplification unit 3B, as a optical amplification unit for amplifying the signal light of a predetermined wavelength less than the wavelength of 1570 nm. Among these optical amplification units, configuration of the first optical amplification unit 3A is similar to the configuration of the optical amplifier 2 shown in FIG. 8.

The second optical amplification unit 3B of the optical amplifier 3 comprises a third amplification optical fiber 40 of a third amplification optical waveguide, as an amplification optical waveguide constituting an optical transmission line in the optical amplification unit 3B. An optical fiber which can amplify the signal light in the wavelength band of wavelengths less than 1570 nm is used as the third amplification optical fiber 40. This third amplification optical fiber 40 is connected in parallel with the optical transmission line in the first optical amplification unit 3A composed of the P/Al-codoped EDF 10 and the EDF 20 connected in series.

The propagating direction of the signal light transmitted through the optical transmission line in the optical amplification unit 3B consisting of the amplification optical fiber 40 is controlled by an optical isolator 46 disposed between the input end and the amplification optical fiber 40, and an optical isolator 47 disposed between the amplification optical fiber 40 and the output end. Each of the optical isolators 46, 47 allows light to pass in the forward direction of the optical transmission line, but does not allow light to pass in the backward direction.

A pumping light sources 41, 42 for outputting pumping light of a wavelength λ3 are mounted as a second pumping light supplying means for supplying pumping light of a predetermined wavelength into the amplification optical fiber 40. Among these pumping light sources 41, 42, the pumping light source 41 is connected to the optical transmission line in the optical amplification unit 3B by a WDM coupler 43 which is an optical multiplexing means disposed between the optical isolator 46 and the amplification optical fiber 40. The pumping light source 42 is connected to the optical transmission line in the optical amplification unit 3B by a WDM coupler 44 which is an optical multiplexing means disposed between the amplification optical fiber 40 and the optical isolator 47.

The WDM coupler 43 transmits the signal light coming from the optical isolator 46, to the amplification optical fiber 40 and multiplexes the pumping light supplied from the pumping light source 41, onto the amplification optical fiber 40 in the forward direction. The WDM coupler 44 transmits the signal light coming from the amplification optical fiber 40, to the optical isolator 47 and multiplexes the pumping light supplied from the pumping light source 42, onto the amplification optical fiber 40 in the backward direction. In this configuration, the optical amplification unit 3B is constructed as an optical amplifier pumped in two directions.

As described above, in the optical amplifier 3 of the present embodiment, the first optical amplification unit 3A is configured such that the unit 3A is able to amplify the signal light in the wavelength band not less than the wavelength of 1570 nm, by using the P/Al-codoped EDF 10 and the EDF 20. the second optical amplification unit 3B, which is connected in parallel with the first optical amplification unit 3A, is configured such that the unit 3B is able to amplify the signal light in the wavelength band less than the wavelength of 1570 nm, by using the third amplification optical fiber 40.

For the above-stated two optical amplification unit 3A, 3B, an optical multiplexer/demultiplexer 36 for demultiplexing the signal light is disposed on the optical transmission line on the input end 1a side of the optical amplifier 3. An optical multiplexer/demultiplexer 37 for multiplexing the signal light is disposed on the optical transmission line on the output end 1b side of the optical amplifier 3.

Among signal lightwaves demultiplexed in the optical multiplexer/demultiplexer 36, the signal light of a predetermined wavelength not less than the wavelength of 1570 nm is input to the first optical amplification unit 3A and is amplified. Among signal lightwaves demultiplexed in the optical multiplexer/demultiplexer 36, the signal light of a predetermined wavelength less than the wavelength of 1570 nm is input to the second optical amplification unit 3B and is amplified. The signal lightwaves amplified respectively by the first optical amplification unit 3A and the second optical amplification unit 3B are multiplexed by the optical multiplexer/demultiplexer 37 into amplified signal light, and the multiplexed signal light is outputted through the output end 1b.

In the optical amplifier 3 in the present embodiment, the amplification optical fiber 40 of the third amplification optical waveguide is connected in parallel with the P/Al-codoped EDF 10 and the EDF 20 connected in series in the first optical amplification unit 3A, and the second optical amplification unit 3B is configured by using the amplification optical fiber 40. This enables the amplification of the signal light of a wavelength not less than the wavelength of 1570 nm (e.g. the signal light in the L-band wavelength band) and the amplification of the signal light of a wavelength less than the wavelength of 1570 nm (e.g. the signal light in the C-band wavelength band or the S-band wavelength band). Thus the optical amplifier for amplifying the signal light in a wide wavelength band is realized.

For the third amplification optical fiber 40 of the second optical amplification unit 3B, for example, an optical fiber doped with Er (EDF) in a predetermined dopant amount can be used. In this case, the second optical amplification unit 3B is configured as the EDFA for amplifying the signal light of a predetermined wavelength less than the wavelength of 1570 nm, e.g. the signal light in the C-band wavelength band.

Alternatively, for the third amplification optical fiber 40, an optical fiber doped with Tm (TDF) in a predetermined dopant amount can be used. In this case, the second optical amplification unit 3B is configured as the TDFA (Thulium-Doped Fiber Amplifier) for amplifying the signal light of a predetermined wavelength not more than the wavelength of 1530 nm, e.g. the signal light in the S-band wavelength band.

Further, as for the optical amplification unit connected in parallel with the first optical amplification unit for amplifying the signal light in a wavelength band of wavelengths not less than 1570 nm, two or more optical amplification units can be arranged. For example, the following configuration can be used; namely, for the first optical amplification unit, a second optical amplification unit composed of EDFA for amplifying the signal light in a wavelength band of wavelengths less than 1570 nm is connected in parallel and, in addition, a third optical amplification unit composed of TDFA for amplifying the signal light in a wavelength band of wavelengths not more than 1530 nm is connected in parallel.

Figure 10:
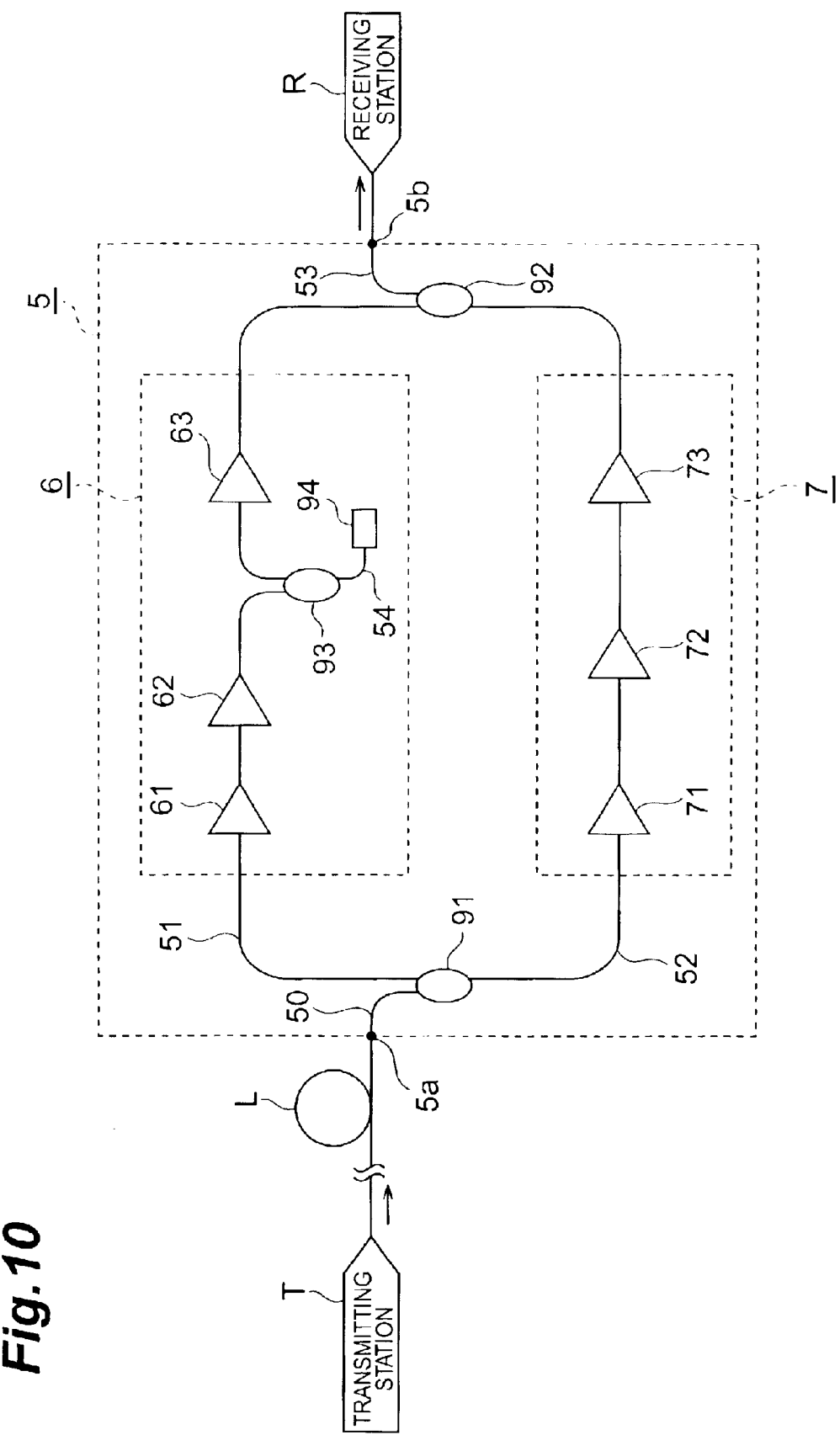
FIG. 10 is a configuration diagram schematically showing an optical amplification system as a fourth embodiment of the optical amplifier, and an optical transmission system using the optical amplification system.

FIG. 10 is a configuration diagram schematically showing an optical amplification system as a fourth embodiment of the optical amplifier, and an optical transmission system using the optical amplification system. The optical amplification system (optical amplifier) 5 in the present embodiment comprises three L-band EDFAs 61, 62, 63 as optical amplifiers for amplifying the signal light in the L-band wavelength band (e.g. the wavelength band of wavelengths from 1570 to 1600 nm). These EDFAs 61, 62, 63 all are optical amplifiers each having the two-stage configuration shown in FIG. 1 or FIG. 8. A first optical amplifier (first optical amplification unit) 6 for the L-band is configured by using these EDFAs 61, 62, 63, for amplifying the signal light of a wavelength not less than the wavelength of 1570 nm.

The optical amplification system 5 also comprises three C-band EDFAs 71, 72, 73 as optical amplifiers for amplifying the signal light in the C-band wavelength band (e.g. the wavelength band of wavelengths from 1530 to 1565 nm). A second optical amplifier (second optical amplification unit) 7 for the C-band is configured by using these EDFAs 71, 72, 73, for amplifying the signal light of a wavelength less than the wavelength of 1570 nm.

For the above-stated two optical amplifiers 6, 7, a C/L multiplexer/demultiplexer 91 for demultiplexing the signal light is disposed on the optical transmission line on the input end 5a side of the optical amplification system 5. A C/L multiplexer/demultiplexer 92 for multiplexing the signal light is disposed on the optical transmission line on the output end 5b side of the optical amplification system 5.

The signal light including the signal light in the C-band wavelength band and the signal light in the L-band wavelength band from an input optical transmission line 50 is fed through the input end 5a into the C/L multiplexer/demultiplexer 91 to be demultiplexed.

Among signal lightwaves demultiplexed in the C/L multiplexer/demultiplexer 91, the signal light in the L-band wavelength band is outputted into an L-band amplification optical transmission line 51. The L-band EDFAs 61, 62, 63 are placed in order from the C/L multiplexer/demultiplexer 91 side, on the L-band amplification optical transmission line 51. The L-band signal light is successively amplified by these EDFAs 61, 62, 63 and thereafter is fed into the C/L multiplexer/demultiplexer 92.

Among the signal lightwaves demultiplexed in the C/L multiplexer/demultiplexer 91, the signal light in the C-band wavelength band is outputted into a C-band amplification optical transmission line 52. The C-band EDFAs 71, 72, 73 are placed in order from the C/L multiplexer/demultiplexer 91 side, on the C-band amplification optical transmission line 52. The C-band signal light is successively amplified by these EDFAs 71, 72, 73 and thereafter is fed into the C/L multiplexer/demultiplexer 92.

The amplified L-band signal lightwave and C-band signal lightwave fed each into the C/L multiplexer/demultiplexer 92 are multiplexed by the C/L multiplexer/demultiplexer 92 into amplified signal light containing the signal light in the C-band wavelength band and the signal light in the L-band wavelength band. Then the multiplexed signal light is outputted through the output end 5b into an output optical transmission line 53.

In the present embodiment, a C/L multiplexer/demultiplexer 93 is further provided between the L-band EDFAs 62, 63 disposed on the L-band amplification optical transmission line 51. This C/L multiplexer/demultiplexer 93 functions as an optical filter for removing the light in a wavelength band of wavelengths not more than 1565 nm (e.g. the C-band wavelength band). Namely, the signal light outputted from the L-band EDFA 62 is fed into the C/L multiplexer/demultiplexer 93 to be demultiplexed.

Among signal lightwaves demultiplexed in the C/L multiplexer/demultiplexer 93, the signal light in the L-band wavelength band is further outputted toward the L-band EDFA 63 of the downstream optical amplifier. On the other hand, the signal light in the C-band wavelength band remaining on the L-band amplification optical transmission line 51 side is outputted into an optical transmission line 54. The other end of the optical transmission line 54 than the end on the C/L multiplexer/demultiplexer 93 side is constructed of an antireflection terminator 94. The above configuration removes the signal light in the C-band wavelength band from the signal light transmitted through the L-band amplification optical transmission line 51.

The optical transmission system including the above optical amplification system 5 comprises, as shown in FIG. 10, a transmitting station (transmitter) T for transmitting signal light in a predetermined signal light wavelength band, an optical fiber transmission line L which is an optical transmission line for transmitting the signal light from the transmitting station T, and a receiving station (receiver) R for receiving the signal light transmitted through the optical fiber transmission line L.

The above-stated optical amplification system 5 composed of the first optical amplifier 6 for the L-band and the second optical amplifier 7 for the C-band connected in parallel is installed at a predetermined position on the optical fiber transmission line L. The optical amplification system 5 amplifies the signal light transmitted through the optical fiber transmission line L, by pumping light and, particularly, amplifies the signal light in the L-band wavelength band, and the signal light in the C-band wavelength band.

In the optical amplification system 5 in the present embodiment and the optical transmission system using it, the second optical amplifier 7 for amplifying the signal light having a predetermined wavelength less than the wavelength of 1570 nm is connected in parallel with the first optical amplifier 6 for amplifying the signal light having a predetermined wavelength not less than the wavelength of 1570 nm, and thus the optical amplification system 5 is configured by using these optical amplifiers 6, 7.

This enables the amplification of the signal light of a wavelength not less than the wavelength of 1570 nm (e.g. the signal light in the L-band wavelength band) and the amplification of the signal light of a wavelength less than the wavelength of 1570 nm (e.g. the signal light in the C-band wavelength band). Thus the optical transmission system for suitably transmitting the signal light in a wide wavelength band is realized.

The optical filter for removing the light in a wavelength band of wavelengths not more than 1565 nm can also be a C-band removing filter by a chirped fiber grating, as well as the C/L multiplexer/demultiplexer. In the overall configuration of the optical amplification system 5, for example, a dispersion compensating optical fiber, a gain equalizer, etc. may be added as occasion demands.

Further, as for the optical filter, it is preferable to locate an optical filter for removing light in a wavelength band of wavelengths not more than 1575 nm if necessary, as described above with FIG. 7.

Figure 11:
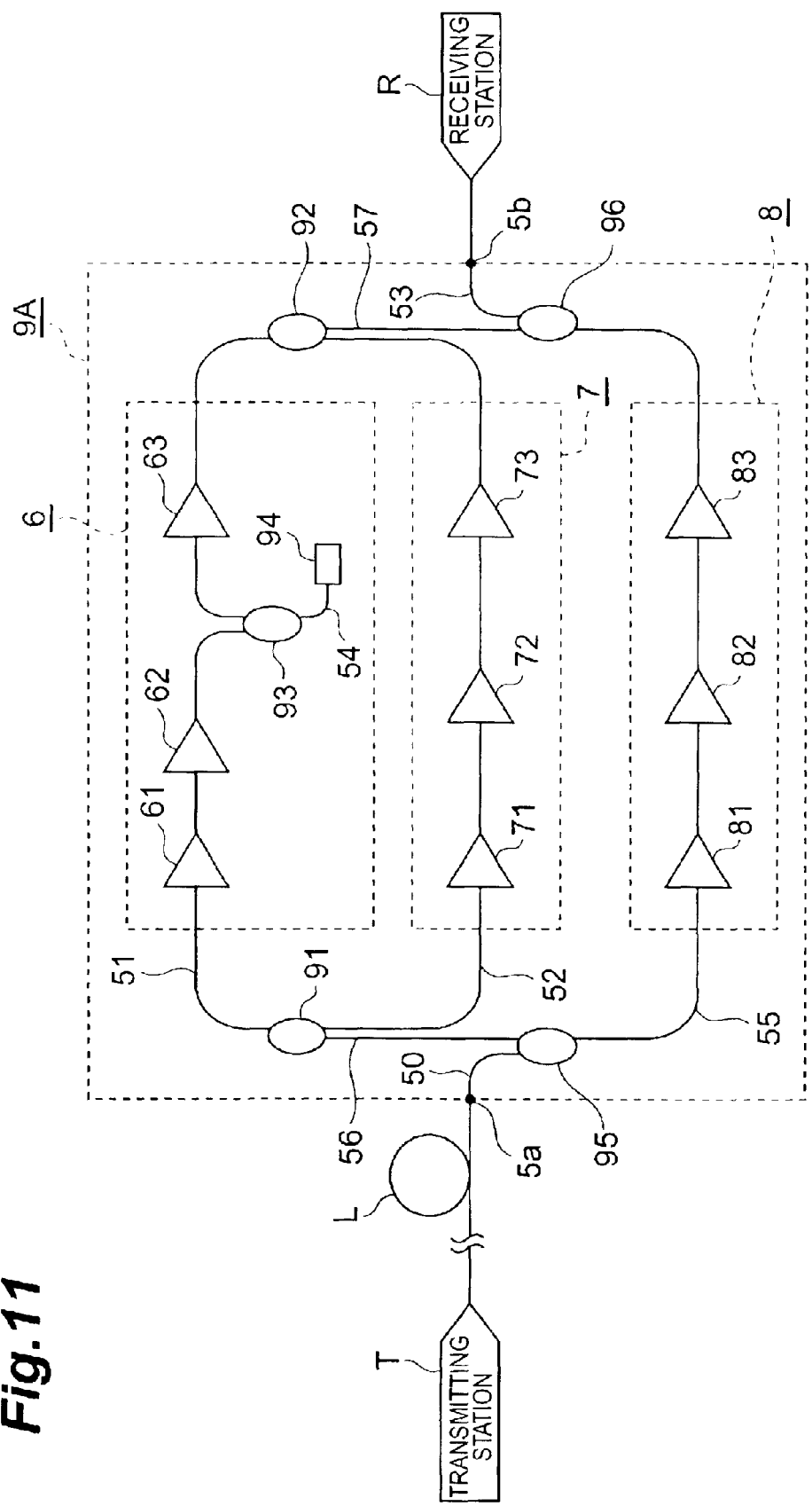
FIG. 11 is a configuration diagram schematically showing an optical amplification system as a fifth embodiment of the optical amplifier, and an optical transmission system using the optical amplification system.

FIG. 11 is a configuration diagram schematically showing an optical amplification system as fifth embodiment of the optical amplifier, and an optical transmission system using the optical amplification system. The optical amplification system 9A in the present embodiment comprises three L-band EDFAs 61, 62, 63 as optical amplifiers for amplifying the signal light in the L-band wavelength band (e.g. the wavelength band of wavelengths from 1570 to 1600 nm). A first optical amplifier 6 for the L-band is configured by using these EDFAs 61, 62, 63, for amplifying the signal light of a wavelength not less than the wavelength of 1570 nm.

The optical amplification system 9A also comprises three C-band EDFAs 71, 72, 73 as optical amplifiers for amplifying the signal light in the C-band wavelength band (e.g. the wavelength band of wavelengths from 1530 to 1565 nm). A second optical amplifier 7 for the C-band is configured by using these EDFAs 71, 72, 73, for amplifying the signal light of a wavelength less than the wavelength of 1570 nm.

The optical amplification system 9A also comprises three S-band TDFAs 81, 82, 83 as optical amplifiers for amplifying the signal light in the S-band wavelength band (e.g. the wavelength band of wavelengths from 1460 to 1530 nm). A third optical amplifier 8 for the S-band is configured by using these TDFAs 81, 82, 83, for amplifying the signal light of a wavelength not more than 1530 nm.

For the above-stated three optical amplifiers 6, 7, 8, a S/C+L multiplexer/demultiplexer 95 for demultiplexing the signal light is disposed on the optical transmission line on the input end 5a side of the optical amplification system 9A. A S/C+L multiplexer/demultiplexer 96 for multiplexing the signal light is disposed on the optical transmission line on the output end 5b side of the optical amplification system 9A.

The signal light including the signal light in the S-band wavelength band, the signal light in the C-band wavelength band, and the signal light in the L-band wavelength band from an input optical transmission line 50 is fed through the input end 5a into the S/C+L multiplexer/demultiplexer 95 to be demultiplexed.

Among signal lightwaves demultiplexed in the S/C+L multiplexer/demultiplexer 95, the signal light in the C-band and L-band wavelength band is fed through an optical transmission line 56 into a C/L multiplexer/demultiplexer 91 to be demultiplexed.

Among signal lightwaves demultiplexed in the C/L multiplexer/demultiplexer 91, the signal light in the L-band wavelength band is outputted into an L-band amplification optical transmission line 51. The L-band EDFAs 61, 62, 63 are placed in order from the C/L multiplexer/demultiplexer 91 side, on the L-band amplification optical transmission line 51. The L-band signal light is successively amplified by these EDFAs 61, 62, 63 and thereafter is fed through a C/L multiplexer/demultiplexer 92 and an optical transmission line 57 into the S/C+L multiplexer/demultiplexer 96.

Among signal lightwaves demultiplexed in the C/L multiplexer/demultiplexer 91, the signal light in the C-band wavelength band is outputted into an C-band amplification optical transmission line 52. The C-band EDFAs 71, 72, 73 are placed in order from the C/L multiplexer/demultiplexer 91 side, on the C-band amplification optical transmission line 52. The C-band signal light is successively amplified by these EDFAs 71, 72, 73 and thereafter is fed through a C/L multiplexer/demultiplexer 92 and an optical transmission line 57 into the S/C+L multiplexer/demultiplexer 96.

Further, among the signal lightwaves demultiplexed in the S/C+L multiplexer/demultiplexer 95, the signal light in the S-band wavelength band is outputted into a S-band amplification optical transmission line 55. The S-band TDFAs 81, 82, 83 are placed in order from the S/C+L multiplexer/demultiplexer 95 side, on the S-band amplification optical transmission line 55. The S-band signal light is successively amplified by these TDFAs 81, 82, 83 and thereafter is fed into the S/C+L multiplexer/demultiplexer 96.

The amplified L-band signal lightwave, C-band signal lightwave, and S-band signal lightwave fed each into the S/C+L multiplexer/demultiplexer 96 are multiplexed by the S/C+L multiplexer/demultiplexer 96 into amplified signal light containing the signal light in the S-band wavelength band, the signal light in the C-band wavelength band, and the signal light in the L-band wavelength band. Then the multiplexed signal light is outputted through the output end 5b into an output optical transmission line 53.

In the present embodiment, a C/L multiplexer/demultiplexer 93 is further provided between the L-band EDFAs 62, 63 disposed on the L-band amplification optical transmission line 51. This C/L multiplexer/demultiplexer 93 functions as an optical filter for removing the light in a wavelength band of wavelengths not more than 1565 nm (e.g. the C-band wavelength band). Namely, the signal light outputted from the L-band EDFA 62 is fed into the C/L multiplexer/demultiplexer 93 to be demultiplexed.

Among signal lightwaves demultiplexed in the C/L multiplexer/demultiplexer 93, the signal light in the L-band wavelength band is further outputted toward the L-band EDFA 63 of the downstream optical amplifier. On the other hand, the light in the C-band wavelength band is outputted into an optical transmission line 54. The other end of the optical transmission line 54 than the end on the C/L multiplexer/demultiplexer 93 side is constructed of an anti-reflection terminator 94. The above configuration removes the light in the C-band wavelength band from the signal light transmitted through the L-band amplification optical transmission line 51.

The optical transmission system including the above optical amplification system 9A comprises, as shown in FIG. 11, a transmitting station T for transmitting signal light in a predetermined signal light wavelength band, an optical fiber transmission line L which is an optical transmission line for transmitting the signal light from the transmitting station T, and a receiving station R for receiving the signal light transmitted through the optical fiber transmission line L.

The above-stated optical amplification system 9A composed of the first optical amplifier 6 for the L-band, the second optical amplifier 7 for the C-band, and the third optical amplifier 8 for the S-band connected in parallel is installed at a predetermined position on the optical fiber transmission line L. The optical amplification system 9A amplifies the signal light transmitted through the optical fiber transmission line L, by pumping light and, particularly, amplifies the signal light in the L-band wavelength band, the signal light in the C-band wavelength band, and the signal light in the S-band wavelength band.

In the optical amplification system 9A in the present embodiment and the optical transmission system using it, the second optical amplifier 7 for amplifying the signal light having a predetermined wavelength less than the wavelength of 1570 nm and the third optical amplifier 8 for amplifying the signal light having a predetermined wavelength not more than the wavelength of 1530 nm are connected in parallel with the first optical amplifier 6 for amplifying the signal light having a predetermined wavelength not less than the wavelength of 1570 nm, and thus the optical amplification system 9A is configured by using these optical amplifiers 6, 7, 8.

This enables the amplification of the signal light of a wavelength not more than the wavelength of 1530 nm (e.g. the signal light in the S-band wavelength band) in addition to the amplification of the signal light of a wavelength not less than the wavelength of 1570 nm (e.g. the signal light in the L-band wavelength band) and the amplification of the signal light of a wavelength less than the wavelength of 1570 nm (e.g. the signal light in the C-band wavelength band). Thus the optical transmission system for suitably transmitting the signal light in a further wide wavelength band is realized.

Figure 12:
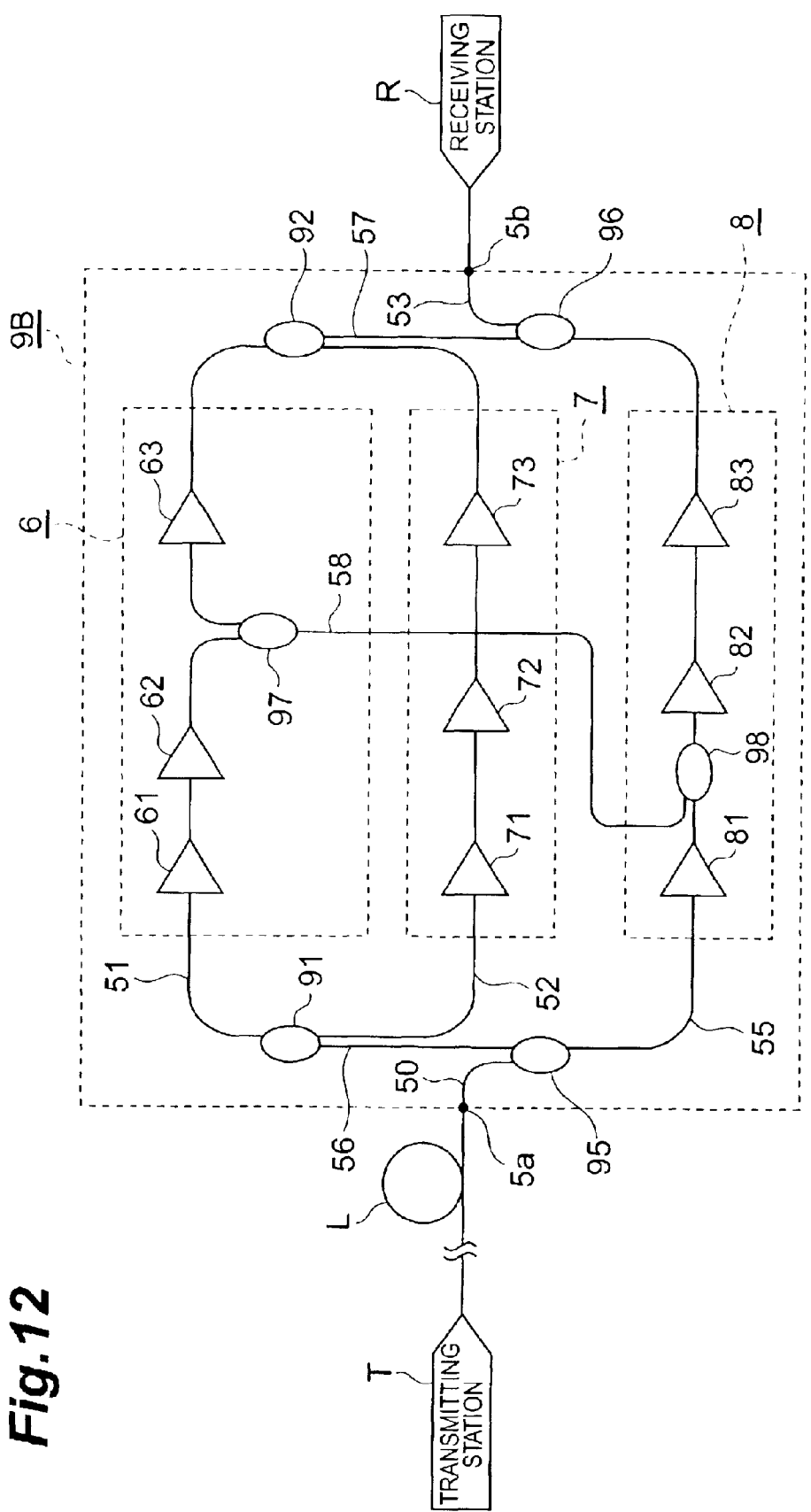
FIG. 12 is a configuration diagram schematically showing an optical amplification system as a sixth embodiment of the optical amplifier, and an optical transmission system using the optical amplification system.

FIG. 12 is a configuration diagram schematically showing an optical amplification system as sixth embodiment of the optical amplifier, and an optical transmission system using the optical amplification system. The optical amplification system 9B in the present embodiment comprises a first optical amplifier 6 for the L-band for amplifying the signal light of a wavelength not less than the wavelength of 1570 nm, a second optical amplifier 7 for the C-band for amplifying the signal light of a wavelength less than the wavelength of 1570 nm, and a third optical amplifier 8 for the S-band for amplifying the signal light of a wavelength not more than the wavelength of 1530 nm. Configurations of these optical amplifiers 6, 7, 8, the multiplexers/demultiplexers, and the optical transmission lines are similar to these in the embodiment shown in FIG. 11.

In the present embodiment, a C/L multiplexer/demultiplexer 97 is further provided between the L-band EDFAs 62, 63 disposed on the L-band amplification optical transmission line 51. This C/L multiplexer/demultiplexer 97 functions as an optical filter for removing the light in a wavelength band of wavelengths not more than 1565 nm (e.g. the C-band wavelength band). Namely, the signal light outputted from the L-band EDFA 62 is fed into the C/L multiplexer/demultiplexder 97 to be demultiplexed.

Among signal lightwaves demultiplexed in the C/L multiplexer/demultiplexer 97, the signal light in the L-band wavelength band is further outputted toward the L-band EDFA 63 of the downstream optical amplifier. On the other hand, the light in the C-band wavelength band is outputted into an optical transmission line 58.

In addition, a S/C multiplexer/demultiplexer 98 is provided between the S-band TDFAs 81, 82 disposed on the S-band amplification optical transmission line 55. The other end of the optical transmission line 58 than the end on the C/L multiplexer/demultiplexer 97 side is connected to the S/C multiplexer/demultiplexer 98. The above configuration removes the light in the C-band wavelength band from the signal light transmitted through the L-band amplification optical transmission line 51. Further, the removed light in the C-band wavelength band is inputted into the third optical amplifier 8 for the S-band, via the S/C multiplexer/demultiplexer 98 in the forward direction, at a predetermined position on the optical transmission line 55 between an input end and an output end of the third optical amplifier 8.

The optical transmission system including the above optical amplification system 9B comprised, as shown in FIG. 12, a transmitting station T for transmitting signal light in a predetermined signal light wavelength band, an optical fiber transmission line L which is an optical transmission line for transmitting the signal light from the transmitting station T, and a receiving station R for receiving the signal light transmitted through the optical fiber transmission line L.

The above-stated optical amplification system 9B composed of the first optical amplifier 6 for the L-band, the second optical amplifier 7 for the C-band, and the third optical amplifier 8 for the S-band connected in parallel is installed at a predetermined position on the optical fiber transmission line L. The optical amplification system 9B amplifies the signal light transmitted through the optical fiber transmission line L, by pumping light and, particularly, amplifies the signal light in the L-band wavelength band, the signal light in the C-band wavelength band, and the signal light in the S-band wavelength band.

In the optical amplification system 9B in the present embodiment and the optical transmission system using it, as in the optical amplification system 9A shown in FIG. 11, the second optical amplifier 7 for amplifying the signal light having a predetermined wavelength less than the wavelength of 1570 nm and the third optical amplifier 8 for amplifying the signal light having a predetermined wavelength not more than the wavelength of 1530 nm are connected in parallel with the first optical amplifier 6 for amplifying the signal light having a predetermined wavelength not less than the wavelength of 1570 nm, and thus the optical amplification system 9B is configured by using these optical amplifiers 6, 7, 8.

This enables the amplification of the signal light of a wavelength not more than the wavelength of 1530 nm (e.g. the signal light in the S-band wavelength band) in addition to the amplification of the signal light of a wavelength not less than the wavelength of 1570 nm (e.g. the signal light in the L-band wavelength band) and the amplification of the signal light of a wavelength less than the wavelength of 1570 nm (e.g. the signal light in the C-band wavelength band). Thus the optical transmission system for suitably transmitting the signal light in a further wide wavelength band is realized.

Further, in this embodiment, the light removed by the optical filter from the first optical amplifier 6 for the L-band, in the wavelength band of wavelengths not more than 1565 nm (e.g. the light in the C-band wavelength band) is inputted into the third optical amplifier 8 for the S-band. In this configuration, the amplification gain and the pumping efficiency for the signal light are improved in the third optical amplifier 8 composed of TDFA or the like.

Namely, when TDF, which is an optical fiber doped with Tm (Thulium), is used as a amplification optical waveguide for the S-band, it is important to enhance Tm-ion distribution on the lower level $^3F_4$, before enhancing distribution on the upper level $^3H_4$ related to the S-band optical amplification (see, for example, Document "Tadashi Kasamatsu et al., OAA1999, Postdeadline paper 1 (1999)"). For this purpose, it is effective to use supplemental pumping light in a wavelength band from 1550 to 1650 nm. However, installing a supplemental pumping light source is not preferable in terms of a cost of an optical amplifier, electricity consumption, and so on.

On the other hand, in the EDFA having the amplification wavelength band of the L-band wavelength band, the ASE light within the C-band wavelength band is generated, as described above. Further, the ASE light power generated in the EDFA for the L-band is normally more than 10 mW.

Therefore, by using the configuration in which the light in the C-band wavelength band, removed from the first optical amplifier 6 for the L-band, is inputted into the third optical amplifier 8 for the S-band, the ASE light generated in the EDFA of the first optical amplifier 6 is supplied to the TDFA of the third optical amplifier 8 and the ASE light functions as the supplemental pumping light. Thus the amplification gain and the pumping efficiency for the signal light in the third optical amplifier 8 are improved at low cost.

The optical amplifier and the optical transmission system using it according to the present invention do not have to be limited to the above embodiments, but can be modified in various ways. For example, while the optical amplifier 1 shown in FIG. 1 is of the two-stage configuration consisting of the first amplification optical fiber 10 and the second amplification optical fiber 20 connected in series, it is also possible to employ a configuration of the optical amplifier having three or more stages of amplification optical fibers by further connecting one or more EDFs in series.

In the optical amplifier 1 of FIG. 1, the optical fibers are used as amplification optical waveguides. When the EDFs such as the P/Al-codoped EDF and others are used as amplification optical waveguides in this way, the optical amplifier can be suitably constructed; e.g., the waveguide length of the amplification optical waveguide can be set at a sufficient length. It is, however, also possible to use optical waveguides other than the optical fibers, e.g., planar optical waveguides as the amplification optical waveguides.

The optical amplifier and the optical transmission system using it according to the present invention provide the following effects, as detailed above. Namely, with the optical amplifier wherein the amplification optical waveguide for amplifying the signal light is comprised of at least two stages of amplification optical waveguides each doped with Er and wherein the P/Al-codoped Er-doped optical waveguide is used as an upstream optical waveguide out thereof, it is feasible to amplify the signal light at or above the wavelength of 1570 nm and to improve the noise characteristics in the wavelength band not less than the wavelength of 1570 nm.

Since the downstream Er-doped optical waveguide is connected to the upstream P/Al-codoped Er-doped optical waveguide, the satisfactory amplification gain can be secured in the whole of the amplification optical waveguide while the noise characteristics are suitably maintained. The above realizes the optical amplifier capable of amplifying the signal light in the signal light wavelength band of not less than the wavelength of 1570 nm including the L-band wavelength band of wavelengths from 1570 to 1600 nm, with good gain characteristics, and achieving the improvement in the noise characteristics.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplifier for amplifying signal light propagating in an amplification optical waveguide, comprising:

a silica-based first amplification optical waveguide doped with Er, P, and Al in respective predetermined dopant amounts;

a silica-based second amplification optical waveguide doped with Er in a predetermined dopant amount; and pumping light supplying means for supplying pumping light of a predetermined wavelength into each of said first amplification optical waveguide and said second amplification optical waveguide, wherein said first amplification optical waveguide and said second amplification optical waveguide are connected in series so that said first amplification optical waveguide is located upstream and said second amplification optical waveguide downstream in a propagating direction of said signal light, and wherein said first amplification optical waveguide and said second amplification optical waveguide amplify said signal light of a predetermined wavelength not less than the wavelength of 1570 nm, and wherein said second amplification optical waveguide is doped with Al in a predetermined dopant amount in addition to being doped with Er and is formed without being doped with P.

2. The optical amplifier according to claim 1, wherein said pumping light supplying means supplies said pumping light into at least one of said first amplification optical waveguide and said second amplification optical waveguide via an optical multiplexing means disposed between said first amplification optical waveguide and said second amplification optical waveguide.

3. The optical amplifier according to claim 1, wherein an optical device which has an attenuation ratio for light propagating in a backward direction of a propagating direction of said signal light larger than that for light propagating in a propagating direction of said signal light is placed between said first amplification optical waveguide and said second amplification optical waveguide.

4. The optical amplifier according to claim 1, wherein said pumping light supplying means supplies 1.48 $\mu$m-wavelength-band pumping light as said pumping light into said first amplification optical waveguide.

5. The optical amplifier according to claim 1, wherein an unsaturated absorption peak of said first amplification optical waveguide is not more than 760 dB.

6. The optical amplifier according to claim 1, wherein an unsaturated absorption peak of said first amplification optical waveguide is not more than 650 dB.

7. The optical amplifier according to claim 1, wherein said first amplification optical waveguide and said second amplification optical waveguide are a first amplification optical fiber and a second amplification optical fiber, respectively.

8. An optical amplifier for amplifying signal light propagating in an amplification optical waveguide, comprising:

a silica-based first amplification optical waveguide doped with Er, P, and Al in respective predetermined dopant amounts;

a silica-based second amplification optical waveguide doped with Er in a predetermined dopant amount; and pumping light supplying means for supplying pumping light of a predetermined wavelength into each of said first amplification optical waveguide and said second amplification optical waveguide, wherein said first amplification optical waveguide and said second amplification optical waveguide are connected in series so that said first amplification optical waveguide is located upstream and said second amplification optical waveguide downstream in a propagating direction of said signal light, and wherein said first amplification optical waveguide and said second amplification optical waveguide amplify said signal light of a predetermined wavelength not less than the wavelength of 1570 nm, and wherein a population inversion in said first amplification optical waveguide is set so that the relative gain deviation in the wavelength band of wavelengths from 1574 nm to 1614 nm is reduced to half as compared with the gain spectrum obtained when the population inversion is set so as to equalize the gain values at the two gain peaks, and the gain peak at the shorter wavelength side is higher than the gain peak at the longer wavelength side.

9. The optical amplifier according to claim 8, wherein an optical filter for removing light in a wavelength band of wavelengths not more than 1565 nm is placed at a predetermined position on an optical transmission line between an input end and an output end.

10. The optical amplifier according to claim 8, further comprising:

a third amplification optical waveguide which is connected in parallel with the optical waveguide composed of said first amplification optical waveguide and said second amplification optical waveguide connected in series; and second pumping light supplying means for supplying pumping light of a predetermined wavelength into said third amplification optical waveguide, wherein said third amplification optical waveguide amplifies said signal light of a predetermined wavelength less than the wavelength of 1570 nm.

11. An optical transmission system comprising:

an optical transmission line through which signal light in a predetermined signal light wavelength band is transmitted; and the optical amplifier as set forth in claim 8, which is placed at a predetermined position on said optical transmission line and which amplifies said signal light of a predetermined wavelength not less than the wavelength of 1570 nm.

12. An optical transmission system comprising:

an optical transmission line through which signal light in a predetermined signal light wavelength band is transmitted; and an optical amplification system which is placed at a predetermined position on said optical transmission line, wherein said optical amplification system comprises:

a first optical amplifier which is the optical amplifier as set forth in claim 8 and which amplifies said signal light of a predetermined wavelength not less than the wavelength of 1570 nm; and a second optical amplifier which is connected in parallel with said first optical amplifier and which amplifies said signal light of a predetermined wavelength less than the wavelength of 1570 nm.

13. The optical transmission system according to claim 12, wherein said optical amplification system further comprises:

a third optical amplifier which is connected in parallel with said first optical amplifier and said second optical amplifier and which amplifies said signal light of a predetermined wavelength not more than the wavelength of 1530 nm.

14. The optical transmission system according to claim 13, wherein, in said optical amplification system, an optical filter for removing light in a wavelength band of wavelengths not more than 1565 nm is placed at a predetermined position on an optical transmission line between an input end and an output end of said first optical amplifier;

said light removed by said optical filter is inputted into said third optical amplifier at a predetermined position on an optical transmission line between an input end and an output end of said third optical amplifier; and said third optical amplifier is a thulium-doped optical amplifier.

* * * * *